United States Patent
Kuroda et al.

(10) Patent No.: US 11,289,743 B2
(45) Date of Patent: Mar. 29, 2022

(54) BATTERY MODULE AND STORAGE BATTERY SYSTEM

(71) Applicants: Kabushiki Kaisha Toshiba, Minato-ku (JP); Toshiba Infrastructure Systems & Solutions Corporation, Kawasaki (JP)

(72) Inventors: Kazuto Kuroda, Arakawa (JP); Shinichiro Kosugi, Yokohama (JP); Masahiro Sekino, Shinjuku (JP); Norihiro Kaneko, Nerima (JP); Ryo Okabe, Hino (JP); Yusuke Kikuchi, Kawasaki (JP); Yosuke Saeki, Hino (JP); Makoto Noguchi, Chofu (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 174 days.

(21) Appl. No.: 16/076,973

(22) PCT Filed: Feb. 10, 2016

(86) PCT No.: PCT/JP2016/054029
§ 371 (c)(1),
(2) Date: Aug. 9, 2018

(87) PCT Pub. No.: WO2017/138125
PCT Pub. Date: Aug. 17, 2017

(65) Prior Publication Data
US 2019/0044198 A1 Feb. 7, 2019

(51) Int. Cl.
*H01M 10/48* (2006.01)
*H02J 7/00* (2006.01)
(Continued)

(52) U.S. Cl.
CPC ....... *H01M 10/482* (2013.01); *H01M 10/425* (2013.01); *H01M 10/486* (2013.01);
(Continued)

(58) Field of Classification Search
CPC .... H01M 10/482; H01M 2/34; H01M 10/425; H01M 10/63; H01M 10/486;
(Continued)

(56) References Cited

U.S. PATENT DOCUMENTS 5,103,156 A * 4/1992 Jones .................... H02J 7/0091
320/150
2005/0077878 A1 * 4/2005 Carrier ................ H01M 10/441
320/134

(Continued)

FOREIGN PATENT DOCUMENTS

| EP | 2 166 642 A1 | 3/2010 |
| EP | 2 637 248 A1 | 9/2013 |
| JP | 2013-187159 A | 9/2013 |

OTHER PUBLICATIONS

International Search Report dated Apr. 19, 2016 in corresponding PCT/JP2016/054029.

*Primary Examiner* — Akm Zakaria
(74) *Attorney, Agent, or Firm* — Oblon, McClelland, Maier & Neustadt, L.L.P.

(57) ABSTRACT

A battery module includes: a battery cell unit including a plurality of battery cells connected together in series or series-parallel; a cell monitoring unit configured to monitor temperatures and voltages of the battery cells; and a plurality of overtemperature/overvoltage detecting units of n systems (n: an integer greater than or equal to 2). The overtemperature/overvoltage detecting units of the n systems are configured to independently detect an overtemperature or an overvoltage of the battery cells as an abnormal state, and to mutually notify one another of results of the detection. Each (Continued)

of the overtemperature/overvoltage detecting units is configured to, upon being notified that the abnormal state is detected from another overtemperature/overvoltage detecting unit of another system in the battery module, operate on the assumption that the overtemperature/overvoltage detecting unit detects the abnormal state.

5 Claims, 10 Drawing Sheets

(51) Int. Cl.
*H01M 10/42* (2006.01)
*H01M 50/572* (2021.01)
*H01M 10/63* (2014.01)

(52) U.S. Cl.
CPC ......... *H01M 10/63* (2015.04); *H01M 50/572* (2021.01); *H02J 7/0031* (2013.01); *H01M 2010/4271* (2013.01); *H01M 2200/00* (2013.01); *H02J 7/0091* (2013.01)

(58) Field of Classification Search
CPC ..... H01M 2200/00; H01M 2010/0029; H01M 2010/4271; H02J 7/0031; H02J 7/0091; H02J 7/00309; H02J 7/00308
See application file for complete search history.

(56) References Cited

U.S. PATENT DOCUMENTS

| | | |
|---|---|---|
| 2011/0037432 A1 | 2/2011 | Sakurai et al. |
| 2014/0015454 A1* | 1/2014 | Kunimitsu ............. B60L 58/15 318/139 |
| 2014/0272500 A1* | 9/2014 | Roumi .................. G01R 31/64 429/90 |
| 2015/0008931 A1* | 1/2015 | Sugeno .................. B60L 58/10 324/434 |

* cited by examiner

BATTERY MODULE AND STORAGE BATTERY SYSTEM

CROSS-REFERENCE TO RELATED APPLICATIONS

This application is national stage application of International Application No. PCT/JP2016/054029, filed on Feb. 10, 2016, which designates the United States, incorporated herein by reference, the entire contents of which are incorporated herein by reference.

FIELD

An embodiment described herein relates generally to a battery module and a storage battery system.

BACKGROUND

In recent years, for the energy-saving purpose, a large-scale storage battery system has been applied in various fields to enable more efficient use of power by storing and then using power.

Particularly in the mass transportation field including railroads, such a system brings about a large energy-saving effect, and thus, a large-scale storage battery system operable with a higher voltage and having a larger power capacity has been demanded.

DETAILED DESCRIPTION

In general, a battery module according to an embodiment includes a battery cell unit including a plurality of battery cells connected together in series or series-parallel; a cell monitoring unit configured to monitor temperatures and voltages of the battery cells; and a plurality of overtemperature/overvoltage detecting units of n systems (n: an integer greater than or equal to 2). The overtemperature/overvoltage detecting units of the n systems are configured to independently detect an overtemperature or an overvoltage of the battery cells as an abnormal state, and to mutually notify one another of results of the detection. Each of the overtemperature/overvoltage detecting units is configured to, upon being notified that the abnormal state is detected from another overtemperature/overvoltage detecting unit of another system in the battery module, operate on the assumption that the overtemperature/overvoltage detecting unit detects the abnormal state.

Preferred embodiments will be described in detail with reference to the drawings.

Figure 1:
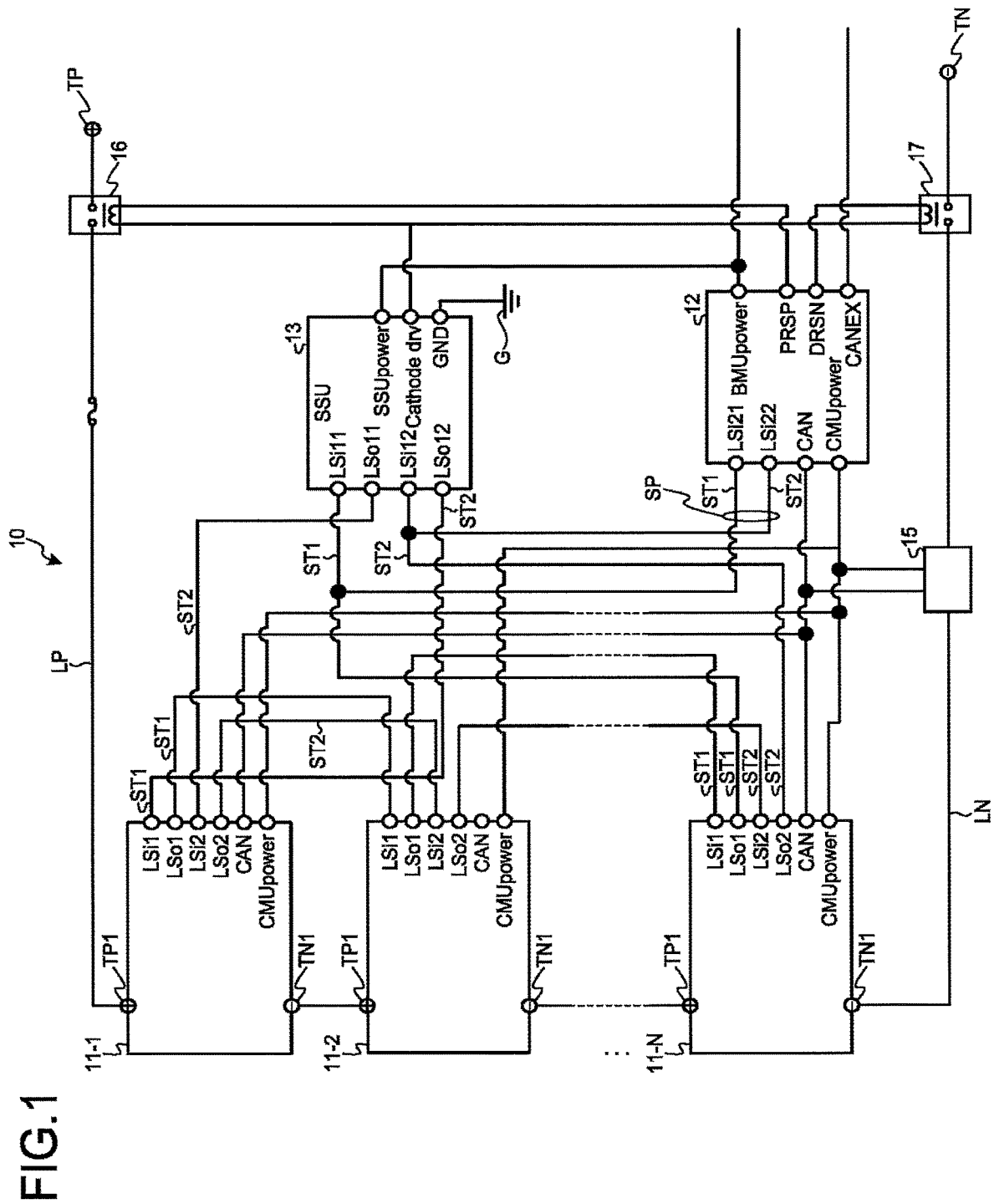
FIG. 1 is a schematic configuration block diagram of a storage battery system according to an embodiment.

FIG. 1 is a schematic configuration block diagram of a storage battery system according to an embodiment.

A storage battery system 10 mainly includes: N battery modules 11-1 to 11-N (N: an integer greater than or equal to 2); a BMU (battery Management Unit) 12 to control the battery modules 11-1 to 11-N; a safety supervisor unit (SSU: Safety Supervisor Unit) 13 to execute a process of shutting off the storage battery system 10 based on a result of communication with the battery modules 11-1 to 11-N; a fuse 14 provided to a high-potential side current line LP and configured to shut off a current path when overcurrent flows; a current sensor 15 provided to a low-potential side current line LN and configured to detect output current; a first contactor (contactor) 16 provided to a high-potential side current line LP and having a normally open contact (normally open); and a second contactor (contactor) 17 provided to a low-potential side current line LN and having a normally open contact.

In the above configuration, the first contactor 16 is connected to a high-potential side power-supply output terminal TP, and the second contactor 17 is connected to a low-potential side power-supply output terminal TN.

Next, the configurations of the battery modules 11-1 to 11-N will be described.

The battery modules 11-1 to 11-N have identical configurations, and thus, the battery module 11-1 will be described as an example.

Figure 2:
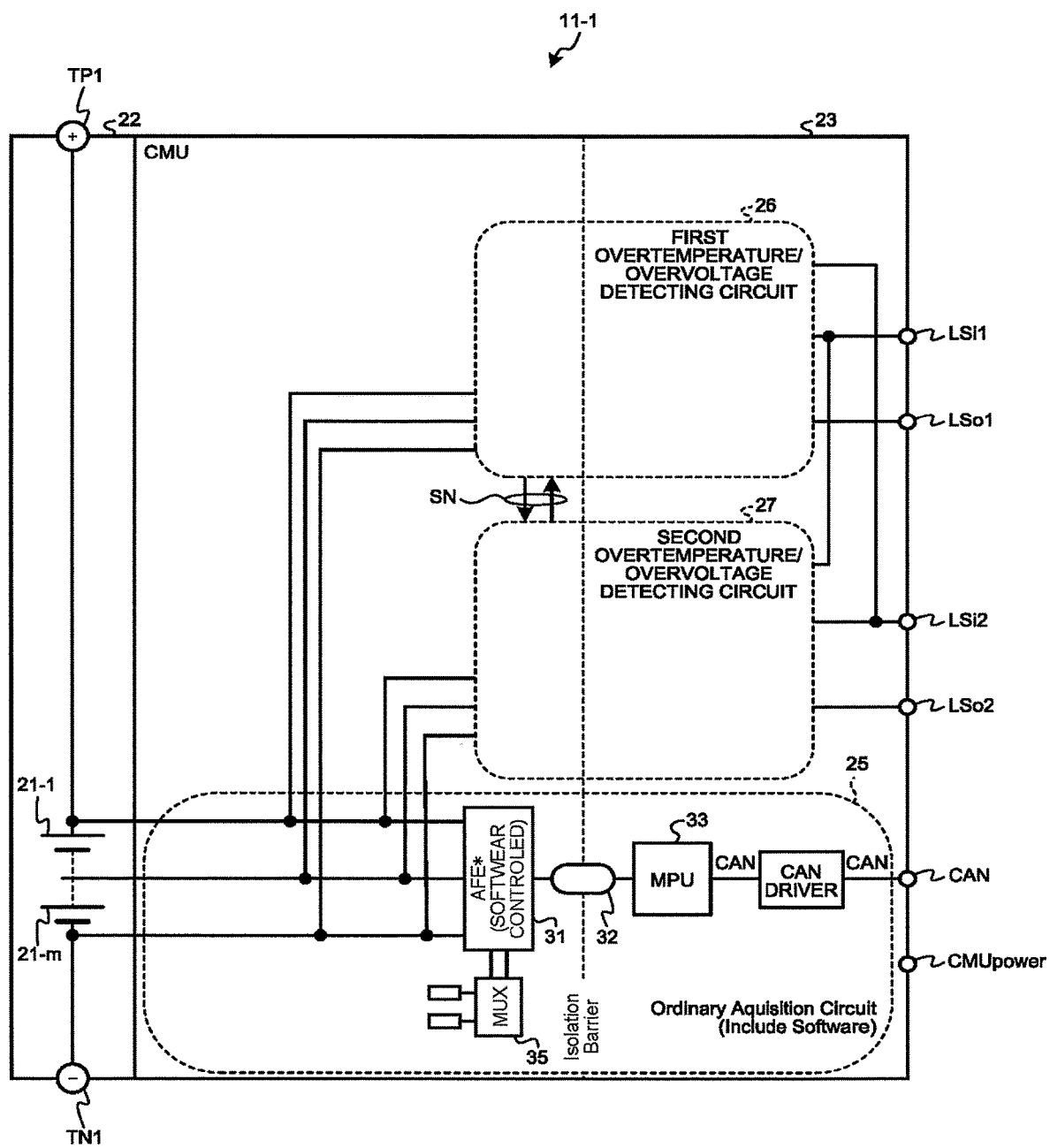
FIG. 2 is a schematic configuration block diagram of a battery module.

FIG. 2 is a schematic configuration block diagram of a battery module.

The battery module 11-1 mainly includes: a battery cell unit 22 including m battery cells 21-1 to 21-$m$ ($m$: an integer greater than or equal to 2) connected in series between a high-potential side terminal TP1 and a low-potential side terminal TN1; and a CMU to monitor the battery cell unit 22 under the control of the BMU 12 and notify the BMU 12 of a result of the monitoring.

The CMU 23 mainly includes: a CMU body 25; a first overtemperature/overvoltage detecting circuit 26 to detect whether each of the battery cells 21-1 to 21-$m$ included in the battery cell unit 22 is in an overtemperature state or an overvoltage state; and a second overtemperature/overvoltage detecting circuit 27 having the same configuration as the first overtemperature/overvoltage detecting circuit 26 and configured to detect, independently from the first overtemperature/overvoltage detecting circuit 26, whether each of the battery cells 21-1 to 21-$m$ included in the battery cell unit 22 is in an overtemperature state or an overvoltage state.

The CML 23 further includes a first operational-state signal input terminal LS11, a first operational-state signal output terminal LSo1, a second operational-state signal input terminal LSi2, a second operational-state signal output terminal LSo2, a CAN communication terminal CAN, and a power supply terminal CMU power.

In the above configuration, the first overtemperature/overvoltage detecting circuit 26 and the second overtemperature/overvoltage detecting circuit 27 exchange overtemperature/overvoltage not-detected signals SN, which are output when neither an overtemperature state nor an overvoltage state has been detected, with each other via a dedicated communication line.

The first overtemperature/overvoltage detecting circuits 26 and the second overtemperature/overvoltage detecting circuits 27 for all of the battery cell units 22 are connected to the safety supervisor unit 13 in two daisy chains. One of the two daisy chains is a daisy chain connected via the first operational-state signal input terminals LSi1 and the first operational-state signal output terminals LSo1, and the other is a daisy-chain connected via the second operational-state signal input terminals LSi2 and the second operational-state signal output terminals LSo2. That is, the first operational-state signal input terminals LSi1 and the first operational-state signal output terminals LSo1 form a first daisy-chain connection system; and the second operational-state signal input terminals LSi2 and the second operational-state signal output terminals LSo2 form a second daisy-chain connection system.

The CMU body 25 includes: an analogue front end (ANN) 31 to measure the voltages and the temperatures of the respective battery cells 21 under the control of software; an MPU 33 to perform insulated communication via the analogue front end 31 and a photo coupler unit 32; a CAN driver 34 to be used for performing communication compliant with CAN (Controller Area Network) communication standards via the CAN communication terminal CAN under the control of the MPU 33; and a multiplexer (switch) 35 to switch temperature sensors from one to another to connect to a temperature sensor which is a monitoring taget.

As described above, the first overtemperature/overvoltage detecting circuit 26 and the second overtemperature/overvoltage detecting circuit 27 have identical configurations, and thus, the first overtemperature/overvoltage detecting circuit 26 will be described as an example.

Figure 3:
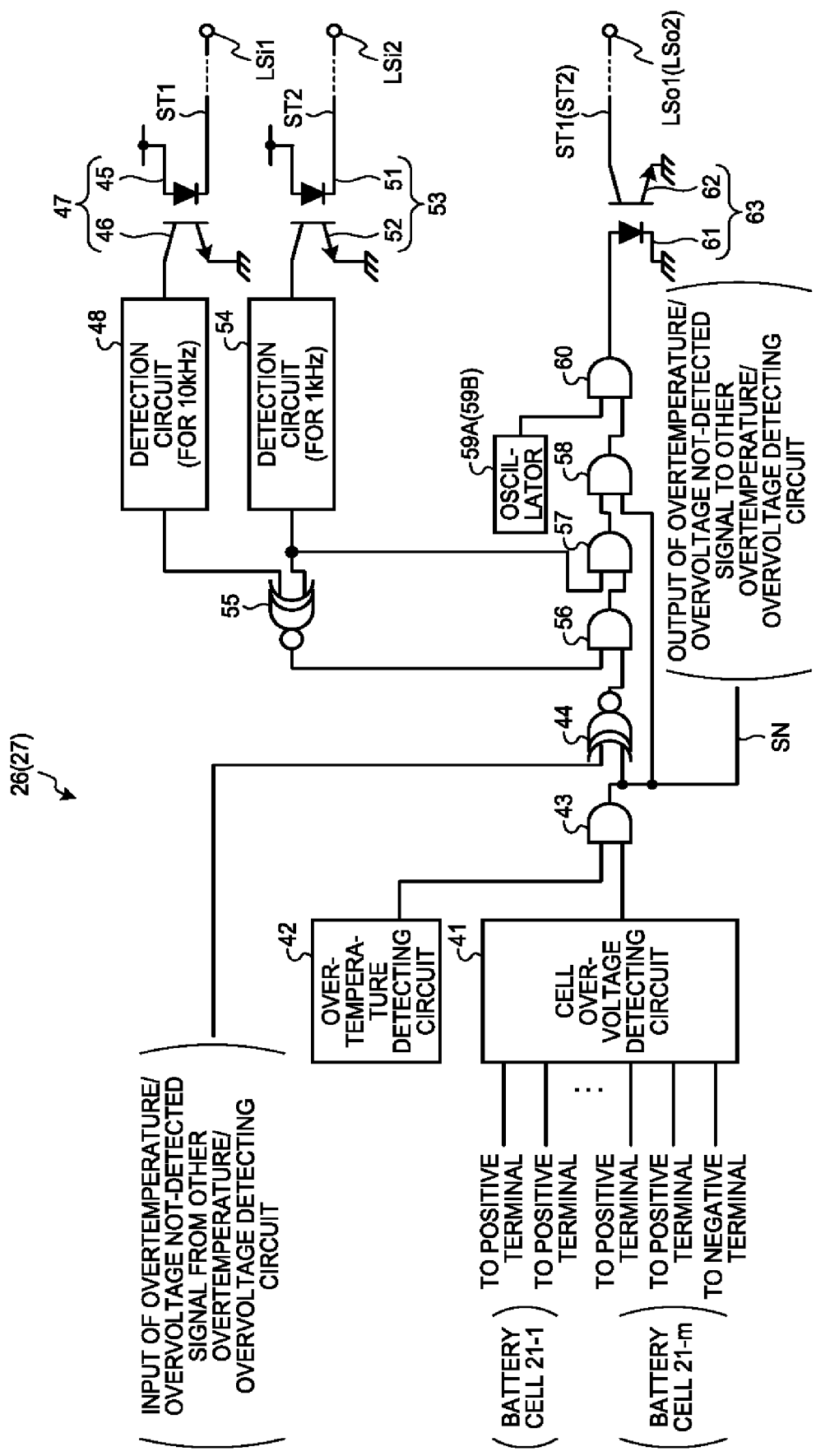
FIG. 3 is a schematic configuration block diagram of a first overtemperature/overvoltage detecting circuit.

FIG. 3 is a schematic configuration block diagram of a first overtemperature/overvoltage detecting circuit.

The first overtemperature/overvoltage detecting circuit 26 includes a cell overvoltage detecting circuit 41 and an overtemperature detecting circuit 42. The cell overvoltage detecting circuit 41 is connected to the respective positive terminals of the battery cells 21-1 to 21-$m$ and respective negative terminals corresponding to those positive terminals to detect the voltages of the respective battery cells 21-1 to 21-$m$. The cell overvoltage detecting circuit 41 outputs, in positive logic (the same applies to allow the following cases), an overvoltage not-detected signal at an "H" level during an overvoltage not-detected time when no overvoltage is detected in any of the battery cells 21-1 to 21-$m$. The overtemperature detecting circuit 42 outputs an overtemperature not-detected signal at the "H" level during an overtemperature not-detected time when no overtemperature is detected in the battery cell unit 22.

The first overtemperature/overvoltage detecting circuit 26 further includes a first AND circuit 43 and a first EX-NOR circuit (exclusive NOR circuit) 44. The first AND circuit 43, to which an overvoltage not-detected signal and an overtemperature not-detected signal are input, calculates the AND of those two input signals, and, if the voltages of the respective battery cells 21-1 to 21-$m$ are normal and the temperature of the battery cell unit 22 is normal, outputs an overtemperature/overvoltage not-detected signal at the "H" level to the other components including the second overtemperature/overvoltage detecting circuit 27. The first EX-NOR circuit 44 calculates and outputs the exclusive NOR of an output from the first AND circuit 43 and an overtemperature/overvoltage not-detected signal output by the second overtemperature/overvoltage detecting circuit 28.

The first overtemperature/overvoltage detecting circuit 2C further includes a first detection circuit 48 and a second detection circuit 54. The first detection circuit 48 performs wave detection through a photo coupler 47. The photo coupler includes: a light emitting diode 45 to emit light in accordance with a square wave, which has a first frequency (10 kHz in this embodiment) and is input from a first operational-state signal input terminal LSi1 when an upstream device (another battery modules or a supervisor device) is determined to be operating normally; and a photo transistor 46 to be put into an operational state in response to light emission of the light emitting diode 45. The second detection circuit 54 performs wave detection through a photo coupler 53. The photo couler 53 includes: a light emitting diode 51 to emit light in accordance with a square wave, which has a second frequency (1 kHz in the present embodiment) and is input from a second operational-state signal input terminal LSi2 when the upstream device is determined to be operating normally; and a photo transistor 52 to be put into an operational state in response to light emission of the light emitting diode 51.

In the above-described configuration, the first frequency and the second frequency are desirably smaller than or equal to 100 kHz so that, for the purpose of preventing malfunction due to inductive interference, these frequencies can be at least ten times as large as a typical alternating-current power frequency (for example, 50 Hz) and can allow the use of a general-purpose photo coupler not designed for high-speed communication and enable suppression of noise due to transfer. From the aspect of facilitating design of a bandpass filter and a detection circuit, the first frequency, which is the frequency of a first operation signal, and the second frequency, which is a second operation signal, are preferably set apart in such a manner that one of these frequencies is at least ten times as large as the other.

The first overtemperature/overvoltage detecting circuit 26 further includes a second EX-NOR circuit 55, a second AND circuit 56, and a third AND circuit 57, and a fourth AND circuit 58. The second EX-NOR circuit 55 calculates and outputs the exclusive NOR of an output from the first detection circuit 48 and an output from the second detection circuit 54. The second AND circuit 56 calculates and outputs the logical AND of output from the first EX-NOR circuit 44 and an output from the second EX-NOR circuit 55. The third AND circuit 57 calculates and outputs the logical AND of an output from the second detection circuit 54 and an output from the second AND circuit 56. The fourth AND circuit 58 calculates and outputs the logical AND of an output from the third AND circuit 57 and an output from the first AND circuit 43.

The first overtemperature/overvoltage detecting circuit 26 further includes that a fifth AND circuit 60 and a photo coupler 63. The fifth AND circuit 60 calculates the logical AND of an output from the fourth AND circuit 58 and an output that is output from an oscillator 59A and has a certain frequency (the above-described first frequency or second frequency), and outputs an operational-state signal (a first operational-state signal ST1 or a second operational-state signal ST2) shaped as a square wave, the oscillator 59A being configured to output an oscillating signal having the first frequency. The photo coupler 63 includes: a light emitting diode 61 to be put into an operational state in accordance with the operational-state signal; and a photo transistor 62 to be put into an operational state in response to light emission of the light emitting diode 61. The photo transistor 62 has the collector terminal thereof connected to the first operational-state signal output terminal LSo1.

It should be noted that the second overtemperature/overvoltage detecting circuit 27 includes, in place of the oscillator 59A, an oscillator 59B to output an oscillating signal having the second frequency (smaller than the first frequency), and the collector terminal of the photo transistor 62 is connected to the second operational-state signal output terminal LSo2.

First Embodiment

Figure 4:
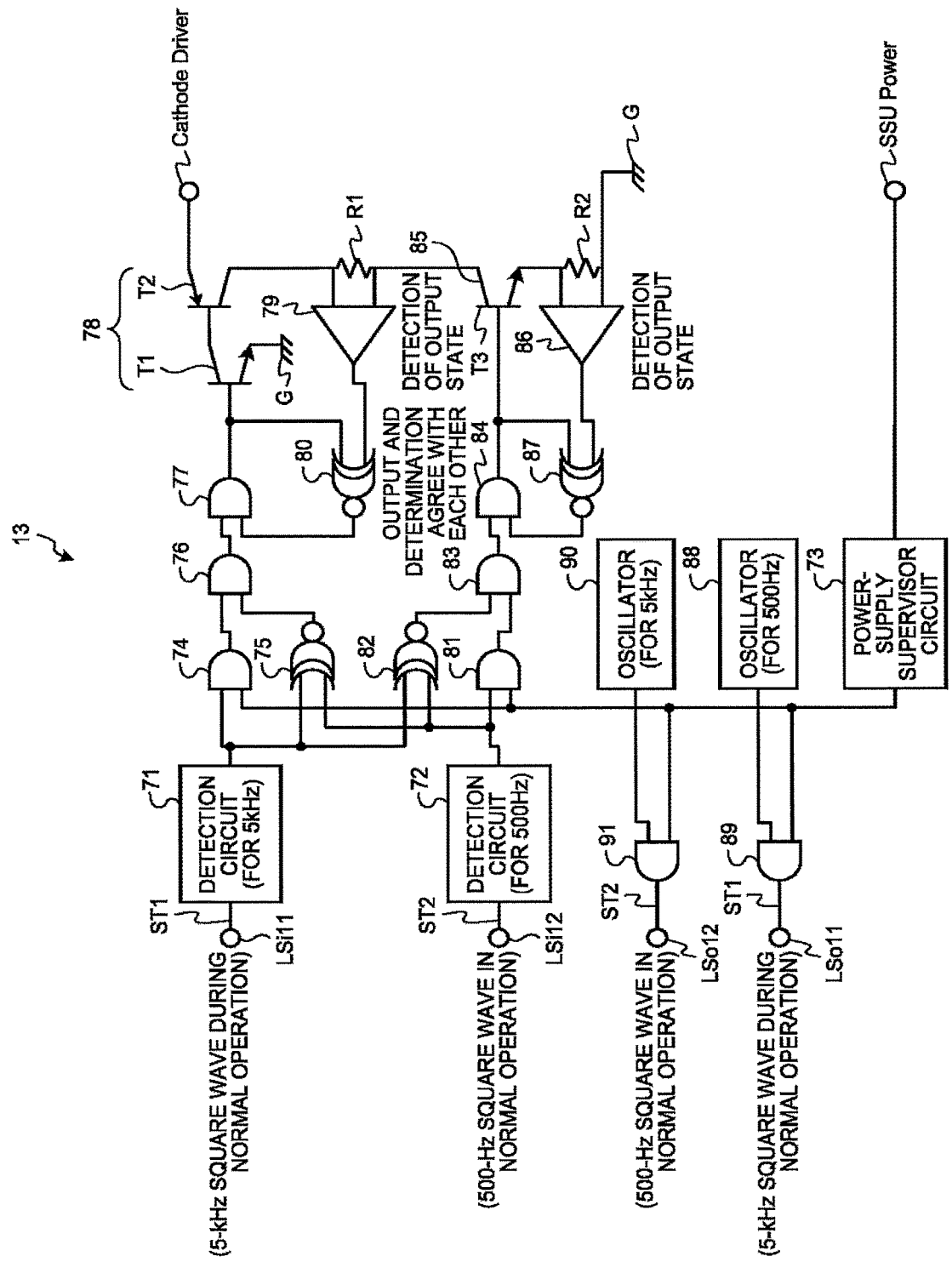
FIG. 4 is a schematic configuration block diagram of a safety supervisor circuit according to a first embodiment.

FIG. 4 is a schematic configuration block diagram of a safety supervisor unit in a first embodiment.

The safety supervisor unit 13 includes a first detection circuit 71, a second detection circuit 72, a power-supply supervisor circuit 73, and a first AND circuit 74. The first detection circuit 71 is connected to a first signal input terminal LSi11 to which the first operational-state signal ST1 having the first frequency (5 kHz in the first embodiment) is input, to detect the signal and, when the first operational-state signal ST1 is being input, outputs a first detection signal at the "H" level. The second detection circuit 72 is connected to a second signal input terminal LSi12 to which the second operational-state signal ST2 having the second frequency (500 Hz in the first embodiment) is input, to detect the signal and, when the second operational-state signal ST2 is being input, outputs a second detection signal at the "H" level. The power-supply supervisor circuit 73 outputs a power supply normality signal at the "H" level when power is being fed thereto from a power supply. The first AND circuit 74 receives the first detection signal through one input terminal thereof and the power supply normality signal through the other input terminal thereof and calculates the logical AND of those two signals to output a first detection normality signal.

The safety supervisor unit 13 further includes a first EX-FOR circuit 75, a second AND circuit 76, and a third AND circuit 77. The first EX-NOR circuit 75 receives the first detection signal through one input terminal thereof and the second detection signal through the other input terminal thereof to calculate the exclusive NOR of those two signals and, if the two signals coincide with each other, outputs a first coincidence signal at the "H" level. The second AND circuit 76 receives a first normality signal through one terminal thereof and the first consistency signal through the other terminal thereof to calculate and output the logical AND of those two signals. The third AND circuit 77 receives an output signal of the second AND circuit 76 through one terminal thereof and an (output signal of a second EX-NOR circuit 80 (described later) through the other terminal thereof and calculates the logical AND of those two signals to output the result as a drive signal.

The safety supervisor unit 13 further includes a drive circuit 78, a first output-state detecting circuit 79, and the second EX-NOR circuit 80. The drive circuit 78 includes an NPN transistor T1 having a base terminal to which a drive signal is input and a PNP transistor T2 having a base terminal to which the collector terminal of the NPN transistor T1 is connected. The drive circuit 78 brings the first contactor 16 and the second contactor 17 into shut-off states upon occurrence of an abnormality. The first output-state detecting circuit 79 detects, based on the voltage between the two ends of a first voltage detection resistance R1, current flowing through respective drive coils of the first contactor 16 and the second contactor 17, and outputs a first output-state detection signal at the "H" level when the EMU 12 is holding the first contactor 16 and the second contactor 17 in the closed state (ON state). The second EX-NOR circuit 80 receives a drive signal through one terminal thereof and the first output-state detection signal through the other terminal thereof and, if the levels of those two signals coincide with each other, outputs a first state detection result signal at the "H" level.

The safety supervisor unit 13 further includes a fourth AND circuit 81, a third EX-NOR circuit 82, a fifth AND circuit 83, and a sixth AND circuit 84. The fourth AND circuit 81 receives the second detection signal through one input terminal thereof and the power supply normality signal through the other input terminal thereof to calculate the logical AND of those signals and output a second detection normality signal. The third EX-NOR circuit 82 receives the first detection signal through one input terminal and the second detection signal through the other input terminal thereof to calculate the exclusive NOR of those signals and, if the input signals coincide with each other, output a third coincidence signal at "H" level. The fifth AND circuit 83 receives the second detection normality signal through one terminal thereof and the third coincidence signal through the other terminal thereof to calculate and output the logical AND of those two signals. The sixth AND circuit 84 receives an output signal of the fifth TD circuit 83 through one terminal thereof and an output signal of a fourth EX-NOR circuit 87 described later through the other terminal thereof to calculate and output, as a second drive signal, the logical AND of those two signals.

The safety supervisor unit 13 further includes a second drive circuit 85, a second output-state detecting circuit 86, and the fourth EX-NOR circuit 87. The second drive circuit 85 includes an NPN transistor T3, to the base terminal of which a second drive signal is input, and brings the first contactor 16 and the second contactor 17 into shut-off states upon occurrence of an abnormality. The second output-state detecting circuit 86 detects, based on the voltage between the two ends of a second voltage detection resistance R2, current flowing through drive coils of the first contactor 16 and the second contactor 17, and outputs a second output-state detection signal at the "H" level when the AMU 12 is holding the first contactor 16 and the second contactor 17 in the closed state (ON state) The fourth EX-NOR circuit 87 receives a second drive signal through one terminal thereof and the second output-state detection signal through the other terminal thereof and, if the levels of those two signals coincide with each other, outputs a second state detection result signal at the "H" level.

The safety supervisor unit 13 further includes a first oscillator 88, a seventh AND circuit 89, a second oscillator 90, and an eighth AND circuit 91. The first oscillator 88 outputs a first oscillating signal having the first frequency (5 kHz in the present embodiment). The seventh AND circuit 89 receives the first oscillating signal through one input terminal thereof and the power supply normality signal and calculates the logical AND of those two signals to generate and output, via a first operational-state signal output terminal LSo11, a first operational-state signal ST1. The second oscillator 90 outputs the second frequency (500 Hz in the first embodiment). The eighth AND circuit 91 receives the second oscillating signal through one input terminal thereof and the power supply normality signal through the other input terminal thereof and calculates the logical AND of those two signals to generate and output, via the second operational-state signal output terminal LSo12, the second operational-state signal ST2.

The operation of the safety supervisor unit 13 is briefly described.

Figure 5:
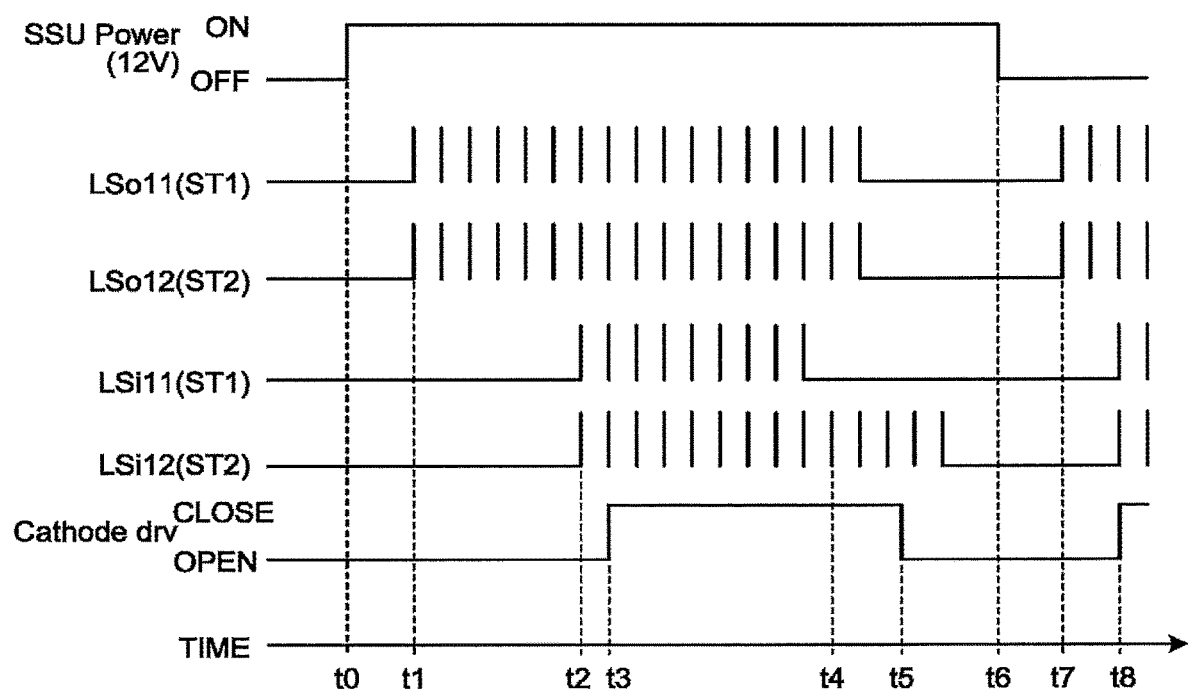
FIG. 5 is an operation timing chart of a safety supervisor unit.

FIG. 5 is an operation timing chart of the safety supervisor unit.

At a clock time t0, power is fed to the safety supervisor unit 13 from a driving power supply (SSU power), so that failure diagnosis (detection of a welding state) is performed on a high-potential side relay 132 and a low-potential side relay 134, which are described later, until power is detected as being fed from a power supply IGCT to the battery modules 11-1 to 11-N.

Thereafter, it is assumed that at a clock time t1, the first operational-state signal ST1 and the second operational-state signal ST2 starts being input to the first battery module 11-1.

The first operational-state signal ST1 and the second operational-state signal ST2 that have been input to this first battery module 11-1 are transferred through the daisy chains to the battery module 11-2, then to the battery module 11-3, . . . , and then to the battery module 11-N to be transferred back to the safety supervisor unit 13 at a clock time t2.

Thus, at a clock time t3, the safety supervisor unit 13 to which the first operational-state signal ST1 and the second operational-state signal ST2 have been transferred back thereto drives the high-potential side relay 132 and the low-potential side relay 134 to set the first contactor 16 and the second contactor 17 in a closed state (close), thereby transitioning to a power feeding state.

Thereafter, for example, as indicated by the period from a clock time t4 to a clock time t5, when any of the first operational-state signal ST1 and the second operational-state signal ST2 has not been transferred at least a certain time (for example, one second) for example, the safety supervisor unit 13 interprets this event as indicating an operational abnormality and sets the first contactor 16 and the second contactor 17 in an open state (open), thereby transitioning to a no-power feeding state.

Thereafter, the safety supervisor unit 13 is reset when power feeding from the driving power supply (SSU power) is stopped as indicated by a clock time t6, then starts inputting the first operational-state signal ST1 and the second operational-state signal ST2 to the battery module 11-1, the first one of the battery modules, at a clock time t7, and then repeats the same operation when the first operational-state signal ST1 and the second operational-state signal ST2 are again transferred to the safety supervisor unit 13 at a clock time t8.

Figure 6:
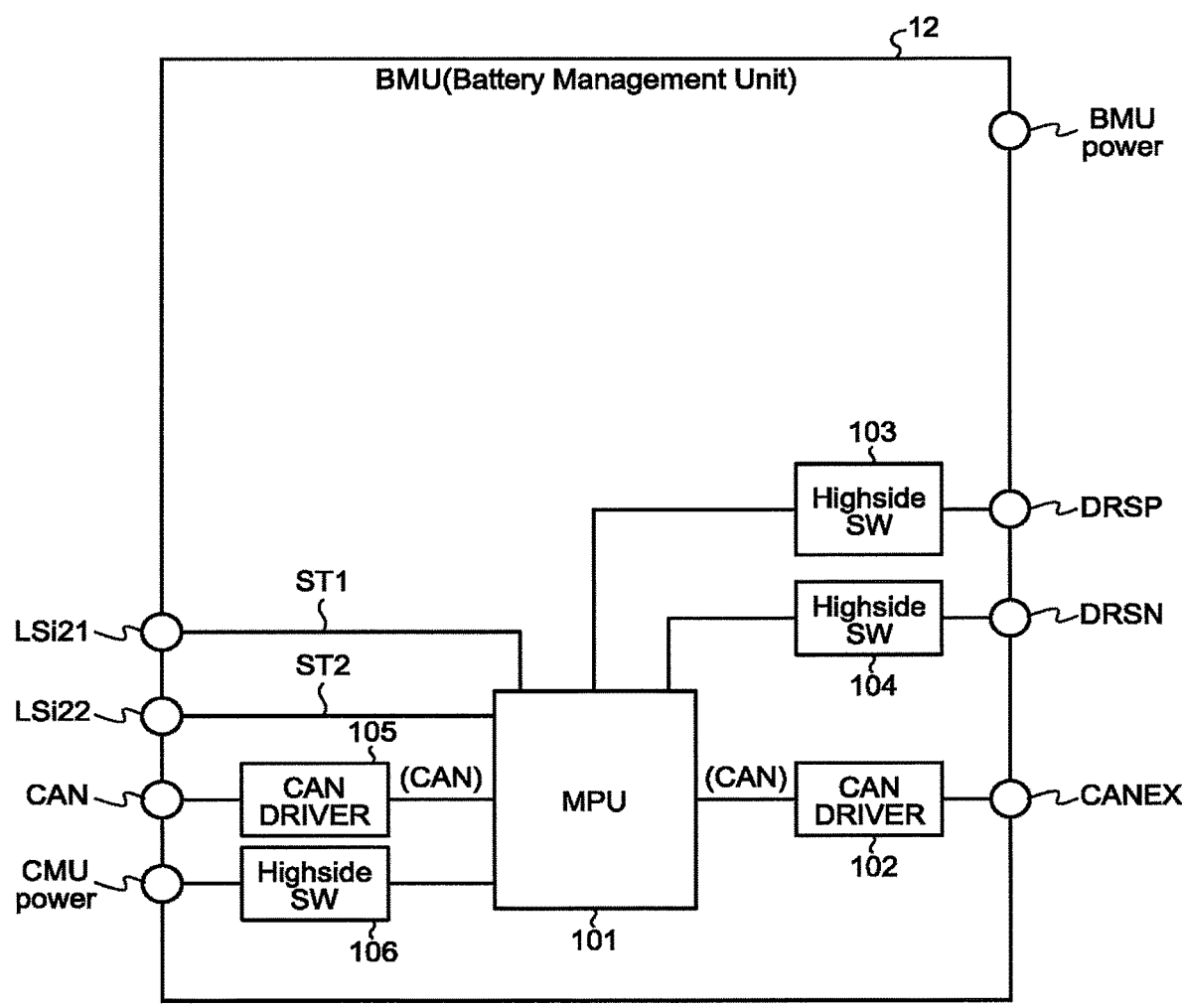
FIG. 6 is a schematic configuration block diagram of a battery management unit (BMU).

FIG. 6 is a schematic configuration block diagram of the BMU.

The BMU 12 includes an MPU 101, a first CAN driver 102, and a first highside switch 103. The MPU 101 is connected to a first signal input terminal LSi21 to which the first operational-state signal ST1 is input and a second signal input terminal LSi22 to which the second operational-state signal ST2 is input, and controls the entirety of the EMU 12. The first CAN driver 102 performs communication compliant with CAN standards with a locomotive controller of a train having the storage battery system 10 installed therein. The first highside switch 103 operates under the control of the MPU 101 and feed power via a high-potential side drive terminal DRSP from a power supply for bringing the first contactor 16 into the closed state (ON state).

The BMU 12 further includes a second highside switch 104, a second CAN driver 105, and a third highside switch 106. The second highside switch 104 operates under the control of the MPU 101 and feed power via a low-potential side drive terminal DRSN from a power supply for bringing the second contactor 17 into the closed state (ON state). The second CAN driver 105 performs communication compliant with CAN standards via a CAN external-communication terminal CANEX with the CMUs included in the respective battery modules 11-1 to 11-N. The third highside switch 106 operates under the control of the MPU 101 and is used for feeding power from an operational power supply via a CMU power supply feeding terminal CMUPower1 to the CMUs included in the respective battery modules 11-1 to 11-N.

Operation according to the first embodiment is described next.

(1) Operation in Normal State

First, operation to be made when all the components of the storage battery system 10 are in normal states is described.

Upon receiving a power feeding instruction via the first CAN driver 102, the MPU 101 in the EMU 12 controls the third highside switch 106 to feed power from the operational power supply to the CMUs 23 included in the respective battery modules 11-1 to 11-N.

Consequently, the CMU bodies 25, the first overtemperature/overvoltage detecting circuits 26, and the second overtemperature/overvoltage detecting circuits 27 included in the respective battery modules 11-1 to 11-N enter operational states.

The cell overvoltage detecting circuit 41 of the first overtemperature/overvoltage detecting circuit 26 is connected to the positive terminals of the battery cells 21-1 to 21-$m$ and negative terminals corresponding to those positive terminals to detect the voltages of the respective battery cells 21-1 to 21-$m$, and outputs the overvoltage not-detected signal at the "H" level because it is the overvoltage not-detected time, to the first AND circuit 43.

The overtemperature detecting circuit 42 outputs the overtemperature not-detected signal at the "H" level to the first AND circuit 43 because it is the overtemperature not-detected time when no overtemperature is detected in the battery cell unit 22.

As a result of the above steps, the first AND circuit 43 calculates the logical AND of the overvoltage not-detected signal and the overtemperature not-detected signal and outputs the overtemperature/overvoltage not-detected signal at the "H" level to the second overtemperature/overvoltage detecting circuit 27 and other components including one of the terminals of the fourth AND circuit 58.

Subsequently, the first EX-NOR circuit 44 calculates the exclusive NOR of the output from the first AND circuit 43 and the overtemperature/overvoltage not-detected signal output by the second overtemperature/overvoltage detecting circuit 27, both of which are then at the "H" level. The resultant output from the first EX-NOR circuit 44 therefore is the "H" level and is input to one of the input terminals of the second AND circuit.

In parallel to the above steps, the first oscillator 88 of the safety supervisor unit 13 outputs the first oscillating signal having the first frequency (5 kHz in the present embodiment) to one of the input terminals the seventh AND circuit 89.

The seventh AND circuit 89 receives the power supply normality signal at the "H" level through the other input terminal thereof, calculates the logical AND of those two signals to generate the first operational-state signal ST1 (a square wave of 5 kHz in the present embodiment) having the first frequency, and outputs the generated signal via the first operational-state signal output terminal LSo11 to the first overtemperature/overvoltage detecting circuits 26 and the second overtemperature/overvoltage detecting circuits 27 included in the respective battery modules.

The second oscillator 90 of the safety supervisor unit 13 outputs the second oscillating signal having the second frequency (500 Hz in the present embodiment) to one input terminals of the eighth AND circuit 91.

The eighth AND circuit 91 then receives the power supply normality signal at the "H" level through the other input terminal thereof, calculates the logical AND of those two signals to generate the second operational-state signal ST2 (a square wave of 500 Hz in the present embodiment), and outputs the generated signal via the second operational-state signal output terminal LSo12 to the first overtemperature/overvoltage detecting circuits 26 and the second overtemperature/overvoltage detecting circuits 27 included in the respective battery modules 11-1 to 11-N.

Consequently, the light emitting diode 45 of the first overtemperature/overvoltage detecting circuit 26 receives the first operational-state signal ST1 (a square wave of 5 kHz in the present embodiment) and emits light in accordance with the frequency of that first operational-state signal ST1.

Thus, current corresponding to the waveform of the first operational-state signal ST1 flows through the photo transistor 46.

Subsequently, the first detection circuit 48 performs signal detection to extract the first operational-state signal ST1, and, if the first operational-state signal ST1 is extracted, produces an output at the "H" level and outputs the output to one input terminal of the second EX-NOR circuit 55.

Likewise, the light emitting diode 51 of the first overtemperature/overvoltage detecting circuit 26 receives the second operational-state signal ST2 (a square wave of 500 Hz in the present embodiment) and emits light in accordance with the frequency of that second operational-state signal ST2.

Thus, current corresponding to the waveform of the second operational-state signal ST2 flows through the photo transistor 52.

Subsequently, the second detection circuit 54 performs signal detection to extract the second operational-state signal ST2, and, if the second operational-state signal ST2 is extracted, produces an output at the "H" level and outputs the output to the other input terminal of the second EX-NOR circuit 55.

In this case, the two inputs to the second EX-NOR circuit 55 coincide with each other to be the "H" level, so that the second EX-NOR circuit 55 inputs a signal at the "H" level to the other input terminal of the second AND circuit 56.

As a result of the above steps, the output from the second AND circuit 56 is the "H" level and is input to one input terminal of the third AND circuit 57.

Consequently, the third AND circuit 57 calculates the logical AND of the output from the second detection circuit 54 and the output of the second circuit 56 and outputs a signal at the "H" level to one terminal of the fourth AND circuit 58.

Signals at the "H" level are input to the two input terminals of the fourth AND circuit 58, so that the output from the fourth AND circuit 58 also is the "H" level and is input to one input terminal of the fifth AND circuit 60.

In parallel to this step, an oscillator 59A outputs an oscillating signal having the first frequency (5 kHz in the present embodiment) to the other input terminal of the fifth AND circuit 60.

As a result of the above steps, the fifth AND circuit 60 outputs a square wave having the first frequency, that is, the first operational-state signal ST1 to the light emitting diode 61 of the photo coupler 63.

Upon receiving light emitted by the light emitting diode 61, the photo transistor outputs and transfers the first operational-state signal ST1 having the first frequency to a terminal of one (the battery module 11-2 in this case) of the battery modules in accordance with the square wave having the first frequency, the one being connected to the downstream side through the daisy chains.

That is, the first overtemperature/overvoltage detecting circuit 26 in the battery module 11-1 outputs the first operational-state signal ST1 having the first frequency to the battery module 11-2 and thereby can notify a downstream device (the battery module 11-2 in this case) connected in the daisy chains that this first overtemperature/overvoltage detecting circuit 26 is in the overtemperature/overvoltage not-detected state, that the second overtemperature/overvoltage detecting circuit 27 paired therewith is also in the overtemperature/overvoltage not-detected state, and that an upstream device (the safety supervisor unit 13 in this case) connected in the daisy chains is also in the overtemperature/overvoltage not-detected state.

Likewise, the second overtemperature/overvoltage detecting circuit 27 of the battery module 11-1 also outputs the second operational-state signal ST2 having the second frequency (500 Hz in the present embodiment) to the battery module 11-2 and thereby can notify a device (the battery module 11-2 in this case) connected to the downstream side through the daisy chains that this second overtemperature/overvoltage detecting circuit 27 is in the overtemperature/overvoltage not-detected state, that the first overtemperature/overvoltage detecting circuit 26 paired therewith is also in the overtemperature/overvoltage not-detected state, and that a device (the safety supervisor unit 13 in this case) connected to the upstream side through the daisy chains is also in the overtemperature/overvoltage not-detected state.

The first overtemperature/overvoltage detecting circuit 26 and the second overtemperature/overvoltage detecting circuit 27 in each of the battery modules 11-2 to 11-N perform the same operation as above. Thus, each one pair of the first overtemperature/overvoltage detecting circuits 26 and the second overtemperature/overvoltage detecting circuits 27 of the respective battery modules 11-N can notify the safety supervisor unit 13 connected to the downstream side through the daisy chains and the BMU 12, which is performing monitoring from supervisory communication paths SP branching from the respective daisy chains (that is, which is in effect not concerned with communication performed through the daisy chains), that the one pair and the other pairs of the overtemperature/overvoltage detecting circuits are in the overtemperature/overvoltage not-detected state and that all of the battery modules 11-1 to 11-(N-1) connected to the upstream side through the daisy chains are in the overtemperature/overvoltage not-detected state.

The first detection circuit 71 of the safety supervisor unit 13 is connected to the first signal input terminal, to which the first operational-state signal ST1 having the first frequency (5 kHz in the present embodiment) is input, to detect the signal. The first detection circuit 71 then outputs a first detection signal at the "H" level to one of the input terminals of each of the first AND circuit 74, the first EX-NOR circuit 75, and the third EX-NOR circuit 82 because the first operational-state signal ST1 has been input.

Likewise, the second detection circuit 72 is connected to the second signal input terminal, to which the second operational-state signal ST2 having the second frequency (500 Hz in the present embodiment) is input, to detect the signal. The second detection circuit 72 then outputs a second detection signal at the "H" level to one of the input terminals of each of the first EX-NOR circuit 75, the fourth AND circuit 81, and the third EX-NOR circuit 82 because the second operational-state signal ST2 has been input.

In the above state, the first AND circuit 74 calculates the logical AND of two signals input thereto (both at the "H" level) and outputs the first detection normality signal at the "H" level into one of the input terminals of the second AND circuit 76.

The first EX-NOR circuit 75 calculates the exclusive NCR of two signals input thereto (both at the "H" level) and, that is, because those two input signals coincide with each other, outputs the first coincidence signal at the "H" level in the other input terminal of the second AND circuit 76.

Consequently, the second AND circuit 76 calculates the logical AND of the two signals (both at the "H" level) input thereto, and outputs an output signal at the "H" level to one input terminal of the third AND circuit 77.

In the initial state, the output signal from the third AND circuit 77 is an "L" level, and the PNP transistor T2 is effectively in an OFF state. Therefore, the first output-state detection signal from the first output-state detecting circuit 79 is the "L" level and, because the levels of those two signals before coincide with each other, the second EX-NOR circuit 80 outputs the first state detection result signal at the "H" level to the other terminal of the third AND circuit 77.

As a result, the two input signals to the third AND circuit 77 both are the "H" level, and the third AND circuit 77 outputs an output signal at the "H" level, as a drive signal, into the base terminal of the NPN transistor T1 included in the drive circuit 78.

As a result, the NPN transistor T1 included in the drive circuit 78 is brought into the ON state, which brings the PNP transistor T2 into the ON state.

The fourth AND circuit 81 calculates the logical AND of two signals (both at the "H" level) input thereto, and outputs the second detection normality signal at the "H" level to one input terminal of the fifth AND circuit 83.

Furthermore, the third EX-NOR circuit 82 calculates the the exclusive NOR of two signals input thereto (both at the "H" level) and, that is, because those two input signals coincide with each other, outputs the second coincidence signal at the "H" level to the other input terminal of the fifth AND circuit 83.

Consequently, the fifth AND circuit 83 calculates the logical AND of the two signals (both at the "H" level) input thereto, and outputs an output signal at the "H" level into one input terminal of the sixth AND circuit 84.

In the initial state, the output signal from the sixth AND circuit 84 is the "N" level, and the NPN transistor TO is effectively in the OFF state. Therefore, the second output-state detection signal from the second output-state detecting circuit 86 is the "L" level and, because the levels of those two signals therefore coincide with each other, the fourth EX-NOR circuit 87 outputs the second state detection result signal at the "H" level to the other terminal of the sixth AND circuit 84.

As a result, the two input signals to the sixth AND circuit 84 both are the "H" level, and the sixth AND circuit 84 outputs an output signal at the "H" level, as a drive signal, into the base terminal of the NPN transistor T3 included in the drive circuit 85, so that the NPN transistor T3 enters the ON state.

As a result of those steps, all of the NPN transistor T1 and the END transistor T2 included in the rive circuit 78 and the NPN transistor T3 included in the drive circuit 85 enter the ON state. This causes current to flow into a ground G through the emitter terminal and the collector terminal of the PNP transistor T2, the first voltage detection resistance R1, the collector terminal and the emitter terminal of the NPN transistor T3, and the second voltage detection resistance R2. The first contactor 16 provided at the high-potential side current line LP and the second contactor 17 provided at the low-potential side current line LN thereby enter the closed state (ON state), which produces a state in which power can be fed to a load from the battery cell units included in the respective battery modules 11-1 to 11-N.

As described above, it can be understood that, if all of the first overtemperature/overvoltage detecting circuits 26, the second overtemperature/overvoltage detecting circuits 27, and the CMU bodies included in the respective battery modules 11-1 to 11-N have determined that there is no abnormality, a state is brought about in which power can be fed to a load from the battery cell units included in the respective battery modules 11-1 to 11-N.

(2) Operation in Abnormal State (2.1) Cases when Abnormality has been Correctly Detected in any Battery Module Described next is operation to be performed when an abnormality has been correctly detected in any one pair of the first overtemperature/overvoltage detecting circuit 26 and the second overtemperature/overvoltage detecting circuit out of the first overtemperature/overvoltage detecting circuits 26 and the second overtemperature/overvoltage detecting circuits 27 included in the respective battery modules 11-1 to 11-N.

For the sake of simplified description, the following description illustrates a case when the first overtemperature/overvoltage detecting circuit 26 and the second overtemperature/overvoltage detecting circuit 27 included in the battery module 11-1 have correctly detected an abnormality (overvoltage).

First of all, upon receiving a power feeding instruction via the first CAN driver 102, the MPU 101 in the EMU 12 controls the third highside switch 106 to feed power from an operational power supply to the CMUs 23 included in the battery modules 11-1 to 11-N.

Consequently, the CMU bodies 25, the first overtemperature/overvoltage detecting circuits 26, and the second overtemperature/overvoltage detecting circuits 27 included in the respective battery modules 11-1 to 11-N enter operational states.

The cell overvoltage detecting circuit 41 of each of the first overtemperature/overvoltage detecting circuits 26 is connected to the respective positive terminals of the battery cells 1-1 to 21-*m* and the negative terminals corresponding to those positive terminals to detect the respective voltages across the battery cells 21-1 to 21-*m* and, upon detecting an overvoltage of any battery cell 21-X (X: 1, . . . or m) of the battery cells, outputs the overvoltage not-detected signal at the "L" level to the first AND circuit 43.

The overtemperature detecting circuit 42 outputs the overtemperature not-detected signal at the "H" level to the first AND circuit 43 because it is the overtemperature hot-detected time when no overtemperature is detected in the battery cell unit 22.

As a result of the above steps, the first AND circuit 43 calculates the logical AND of the overvoltage not-detected signal and the overtemperature not-detected signal and outputs the overtemperature/overvoltage not-detected signal at the "L" level to the second overtemperature/overvoltage detecting circuit 27 and other components including one of the terminals of the fourth AND circuit 58.

Subsequently, the first EX-NCR circuit 44 calculates the exclusive NOR of the output from the first AND circuit 43 and the overtemperature/overvoltage not-detected signal output by the second overtemperature overvoltage detecting circuit 27, and one and the other hose inputs are the "L" level and the "H" level, respectively. The resultant output from the first. EX-NOR circuit 44 therefore is the "L" level and is input to one of the input terminals of the second AND circuit 56.

In parallel to the above steps, the first oscillator 83 of the safety supervisor unit 15 outputs the first oscillating signal having the first frequency (5 kHz in the present embodiment) to one of the input terminals the seventh AND circuit 89.

The seventh AND circuit 89 receives the power supply normality signal at the "H" level through the other input terminal thereof, calculates the logical AND of those two signals to generate the first operational-state signal ST1 (a square wave of 5 kHz in the present embodiment) having the first frequency, and outputs the generated signal via the first operational-state signal output terminal LSo11 to the first overtemperature/overvoltage detecting circuits 26 and the second overtemperature/overvoltage detecting circuit included in the respective battery modules 11-1 to 11-N.

The second oscillator 90 of the safety supervisor unit 13 outputs the second oscillating signal having the second frequency (500 Hz in the present embodiment) to one input terminals of the eighth AND circuit 91.

The eighth AND circuit 91 then receives the power supply normality signal at the "H" level through the other input terminal thereof, calculates the logical AND of those two signals to generate the second operational-state signal ST2 (a square wave of 500 Hz in the first embodiment), and outputs the generated signal via the second operational-state signal output terminal LSo12 to the first overtemperature/overvoltage detecting circuits 26 and the second overtemperature/overvoltage detecting circuits 27 included in the respective battery modules 11-1 to 11-N.

Consequently, the light emitting diode 45 of the first overtemperature/overvoltage detecting circuit 26 receives the first operational-state signal ST1 (a square wave of 5 kHz in the first embodiment) and emits light in accordance with the frequency of that first operational-state signal ST1.

Thus, current corresponding to the waveform of the first operational-state signal ST1 flows through the photo transistor 46.

Subsequently, the first detection circuit 48 performs signal detection to extract the first operational-state signal ST1, and, if the first operational-state signal ST1 is extracted, produces an output at the "H" level and outputs the output to one input terminal of the second EX-NOR circuit 55.

Likewise, the light emitting diode 51 of the first overtemperature/overvoltage detecting circuit 26 receives the second operational-state signal ST2 (a square wave of 500 Hz in the present embodiment) and emits light in accordance with the frequency of that second operational-state signal ST2.

Thus, current corresponding to the waveform of the second operational-state signal ST2 flows through the photo transistor 52.

Subsequently, the second detection circuit 54 performs signal detection to extract the second operational-state signal ST2, and, if the second operational-state signal ST2 is extracted, produces an output at the "H" level and outputs the output to the other input terminal of the second EX-NOR circuit 55.

In this case, the two inputs to the second EX-NOR circuit 55 coincide with each other to be the "H" level, so that the second EX-NOR circuit 55 inputs a signal at the "H" level to the other input terminal of the second AND circuit 56.

As described above, the output from the first EX-NOR circuit 44 is the "L" level, and the output from the second EX-NOR circuit 55 is the "H" level, so that the output from the second AND circuit 56 is the "L" level and is input to one input terminal of the third AND circuit 57.

Consequently, the third AND circuit 57 calculates the logical AND of the output from the second detection circuit 54 at the "H" level and the output from the second AND circuit 56 at the "L" level, and outputs a signal at the "L" level to one terminal of the fourth AND circuit 58.

Therefore, a signal at the "L" level and a signal at the "H" level are input to one and the other of the input terminals of the fourth AND circuit 58, so that the output from the fourth AND circuit 58 also is the "L" level and is input to one input terminal of the fifth AND circuit 60.

In parallel to this step, the oscillator 59A, outputs an oscillating signal having the first frequency (5 kHz in the present embodiment) to the other input terminal of the fifth AND circuit 60.

As a result of the above steps, the fifth AND circuit 60 outputs the first operational-state signal ST1 at the "L" level to the light emitting diode 61 of the photo coupler 63.

Consequently, the light emitting diode 61 does not emit light, and the output from the photo transistor 62 is kept at the "L" level, so that the photo transistor 62 outputs and transfers the first operational-state signal ST1 at the "L" level to a terminal of one (the battery module 11-2 in this case) of the battery modules, the one being connected to the downstream side through the daisy chains.

That is, the first overtemperature/overvoltage detecting circuit 26 of the battery module 11-1 outputs the first operational-state signal ST1 at the "L" level (at an infinite frequency) to the battery module 11-2 and thereby can notify a device (the battery module 11-2 in this case) connected to the downstream side through the daisy chains that this first overtemperature/overvoltage detecting circuit 26 is in the overtemperature/overvoltage detected state (more precisely, the overtemperature detected state).

Likewise, the second overtemperature/overvoltage detecting circuit 27 of the battery module 11-1 also outputs the first operational-state signal ST1 at the "L" level (at an infinite frequency) to the battery module 11-2 and thereby can notify a device (the battery module 11-2 in this case) connected to the downstream side through the daisy chains that this first overtemperature/overvoltage detecting circuit 26 is in the overtemperature/overvoltage detected state (more precisely, the overtemperature detected state).

As a result of this notification, in each of the first overtemperature/overvoltage detecting circuit 26 and the second overtemperature/overvoltage detecting circuit 27 in each of the battery modules 11-2 to 11-N, an "L"-level output signal is input to one input terminal of the first. EX-NOR circuit 44 from the upstream battery module, so that the first EX-NOR circuit. 44 outputs an "L"-level signal even when the cell overvoltage detecting circuit 41 and the overtemperature detecting circuit 42 both output signals at the "H" level and indicate that there is no abnormality.

Therefore, the first overtemperature/overvoltage detecting circuits 26 in the respective battery modules 11-2 to 11-N output the first operational-state signal ST1 at the "L" level (at an infinite frequency), thereby notifying devices (the battery modules 11-3 to 11-N and the safety supervisor unit 13 in this case) connected to the downstream side through the daisy chains and further notifying the EMU 12, which is performing monitoring from supervisory communication paths branching from the respective daisy chains (that is, which is in effect not concerned with communication performed through the daisy chains), that the overtemperature/overvoltage detected state (more precisely, the overtemperature detected state) is present.

In accordance with this notification, the first detection circuit 71 and the second detection circuit 72 in the safety supervisor unit 13 both output "L"-level detection signals, so that output from the first AND circuit 74, the second AND circuit 76, the third AND circuit 77, the fourth AND circuit 81, the fifth AND circuit 83, and the sixth AND circuit 84 all are the "L" level.

As a result of the above operation, the NPN transistor T1, the PNP transistor T2 included in the drive circuit 78, and the NPN transistor T3 included in the drive circuit 85 all enter the OFF state, so that the first contactor 16 provided at the high-potential side current line LP and the second contactor 17 provided at the low-potential side current line LN enter the open state (OFF state). Thus, power feeding to a load from the battery cell units 22 included in the respective battery modules 11-1 to 11-N is shut off.

The above description clarifies that the safety is reliably ensured in the following manner: when the first overtemperature/overvoltage detecting circuit 26 and the second overtemperature/overvoltage detecting circuit 27 included in the battery module 11-1 have detected an abnormality, all of the battery modules 11-1 to 11-N eventually enter states in which these respective battery modules are supposed to enter upon detecting the abnormality, so that all power feeding to a load from the battery cell units 22 included in the battery modules 11-1 to 11-N reliably enters the shut-off state.

(2.2) Cases when Any One of the Overtemperature/Overvoltage Detecting Circuits in Any Battery Module is Unable to Operate Normally Described next is operation to be performed when, in the battery module 11-*x* of the battery modules 11-1 to 11-N, any one of the first overtemperature/overvoltage detecting circuit 26 and the second overtemperature/overvoltage detecting circuit 27 included in the battery module 11-*x* has become unable to operate normally.

For the sake of simplified description, the following description illustrates a case when the first overtemperature/overvoltage detecting circuit 26 out of the first overtemperature/overvoltage detecting circuit 26 and the second overtemperature/overvoltage detecting circuit 27 included in the battery module 11-1 has become unable to operate normally.

More specifically, it is assumed that the first overtemperature/overvoltage detecting circuit 26 keeps being in the overtemperature/overvoltage not-detected state.

First of all, upon receiving a power feeding instruction via the first CAN driver 102, the MPU 101 in the BM 12 controls the third highside switch 106 to feed power from an operational power supply to the CMUs 23 included in the battery modules 11-1 to 11-N.

Consequently, the CMU bodies 25, the first overtemperature/overvoltage detecting circuits 26, and the second overtemperature/overvoltage detecting circuits 27 included in the respective battery modules 11-1 to 11-N enter operational states.

The first overtemperature/overvoltage detecting circuit 26 being unable to operate normally in the battery module 11-1 is supposed to consequently keep outputting the first operational-state signal ST1 having the first frequency regardless of whether the battery cell unit is normal or abnormal.

However, the second overtemperature/overvoltage detecting circuit 27 in the battery module 11-1, upon detecting an abnormality, outputs the first operational-state signal ST1 at the "L" level (at an infinite frequency) to the battery module 11-2 because input signals of the first EX-NOR circuit 44 coincide with each other. As a result, a device (the battery module 11-2 in this case) connected to the downstream side through the daisy chains is notified that this first overtemperature/overvoltage detecting circuit 26 is in the overtemperature/overvoltage detected state (more precisely, the overtemperature detected state).

It is thus clarified that the safety is reliably ensured in the following manner: the second overtemperature/overvoltage detecting circuit 27 in the battery module 11-1 outputs the second operational-state signal ST2 at the "L" level (at the infinite frequency) and thereby can notify devices connected to the upstream side through the daisy chains, that is, all of the battery modules 11-2 to 11-N and the safety supervisor unit, that the overtemperature/overvoltage detected state (more precisely, the overtemperature detected state) is present, and all of the battery modules 11-1 to 11-N eventually enter states equivalent to those in which these modules have detected any abnormality, so that all power feeding to a load from the battery cell units 22 included in the battery modules 11-1 to 11-N reliably enters the shut-off state.

Second Embodiment

The second embodiment differs from the first embodiment in that a safety supervisor unit includes a self-diagnosis function.

Figure 7:
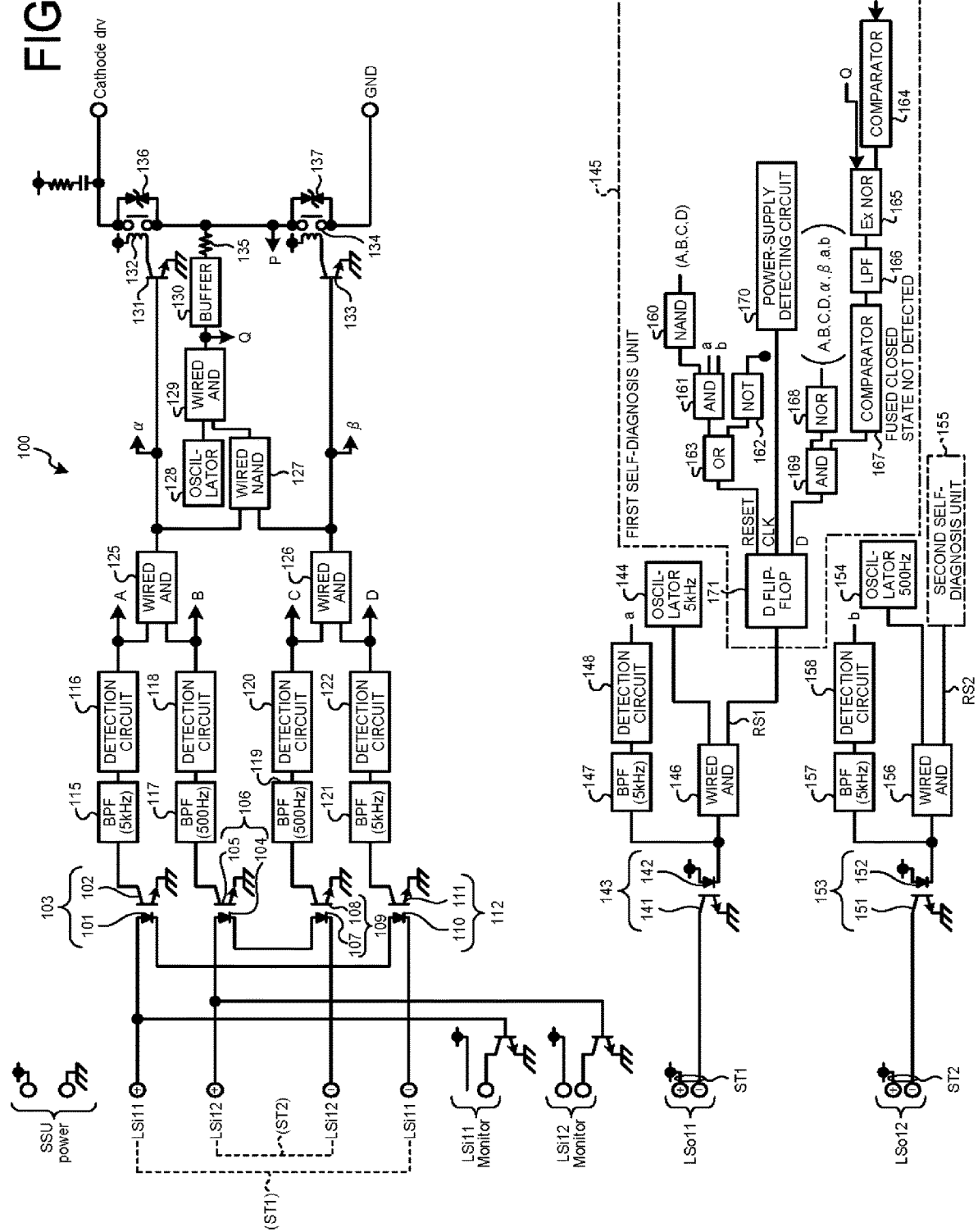
FIG. 7 is a schematic configuration block diagram of a safety supervisor unit according to a second embodiment.

FIG. 7 is a schematic configuration block diagram of a safety supervisor unit in the second embodiment.

The safety supervisor unit 100 includes a first photo coupler 103 and a second photo coupler 106. The first photo coupler 103 includes: a light emitting diode 101 having the anode thereof connected to a first high-potential side signal-input terminal TP1; and a photo transistor 102 to receive light emitted from the light emitting diode 101. The second photo coupler 106 includes: a light emitting diode 104 having the anode thereof connected to a second high-potential side signal-input terminal TP2; and a photo transistor 105 to receive light emitted from the light emitting diode 104.

The safety supervisor unit 100 further includes a third photo coupler 109 and a fourth photo coupler 112. The third photo coupler 109 includes: a light emitting diode 107 having the cathode thereof connected to a second low-potential side signal-input terminal TN2 and having the anode thereof connected to the cathode of the light emitting diode 104; and a photo transistor 108 to receive light emitted from the light emitting diode 107. The fourth photo coupler 112 includes: a light emitting diode 110 having the cathode thereof connected to a first low-potential side signal-input terminal TN1 and having the anode thereof connected to the cathode of the light emitting diode 101; and a photo transistor 111 to receive light emitted from the light emitting diode 110.

The safety supervisor unit 100 further includes a BPS 115, a detection circuit 116, a BPS 117, and a detection circuit 118. The BPS 115 is connected to the collector terminal of the photo transistor 102 of the first photo coupler 103 and has, as a passband, a first frequency range (5 kHz in the second embodiment). The detection circuit 116 detects an output signal of the BPS 115 and outputs a detection signal A. The BPS 117 is connected to the collector terminal of photo transistor 105 of the second photo coupler 106 and has, as a passband, a second frequency range (500 Hz in the second embodiment). The detection circuit 118 detects an output signal of the BPS 117 and outputs a detection signal B.

The safety supervisor unit 100 further includes a BPS 119, a detection circuit 120, a BPS 121, and a detection circuit 122. The BPS 119 is connected to the collector terminal of the photo transistor 108 of the third photo coupler 109 and has, as a passband, the second frequency range. The detection circuit 120 detects an output signal of the BPF 119 and outputs a detection signal C. The BPF 121 is connected to the collector terminal of the photo transistor 111 of the fourth photo coupler 112 and has, as a passband, the first frequency range. The detection circuit 122 detects an output signal of the BPF 121 and outputs a detection signal D.

The safety supervisor unit 100 further includes a wired AND circuit 125, a wired AND circuit 126, a wired NAND circuit 127, an oscillator 128, a wired AND circuit 129, and a buffer 130. The wired AND circuit 125 calculates the logical AND of the detection signal A and the detection signal B to output a logical AND signal α. The wired AND circuit 126 calculates the logical AND of the detection signal C and the detection signal D to output a logical AND signal β. The wired NAND circuit 127 calculates the negative AND of the logical AND signal α and the logical AND signal β to output a negative-AND signal. The oscillator 128 outputs an oscillating signal having a certain frequency. The wired AND circuit 129 receives the NAND signal through one input terminal thereof and the oscillating signal through the other input terminal and calculates the logical AND of those two signals to output a logical AND signal Q. The buffer 130 temporarily stores the logical AND signal Q output by the wired AND circuit 129.

The safety supervisor unit 100 further includes: an NPN transistor 131 to be driven in response to the logical AND signal α input to the base terminal thereof; a high-potential side relay 132 to be driven by the NPN transistor 131 and including a normally open contact; an NPN transistor 133 to be driven in response to the logical AND signal β input to the base terminal thereof; a low-potential side relay 134 connected to the high-potential side relay 132 in series and including a normally open contact, the low-potential side relay being configured to be driven by the NPN transistor 133; a resistance 135 for limiting current; a transient voltage suppressor (TVS) diode 136 connected to the high-potential side relay 132 in parallel so as to suppress transient voltage; and a TVS diode 137 connected to the low-potential side relay 134 in parallel so as to suppress transient voltage.

In this case, the voltage at a contact between the high-potential side relay 132 and the low-potential side relay 134 is detected as a voltage signal P.

The safety supervisor unit 100 further includes a first output photo coupler 143, a first oscillator 144, a first self-diagnosis unit 145, a wired AND circuit 146, a BPF 147, and a detection circuit 148. The first output photo coupler 143 includes a photo transistor 141 and a light emitting diode 142, the photo transistor 141 having the collector terminal thereof connected to a first low-potential side output terminal, and outputs the first operational-state signal ST1 via the first operational-state signal output terminal LSo11. The first oscillator 144 outputs an oscillating signal having the first frequency (5 kHz in the present embodiment). The first self-diagnosis unit 145 outputs a first self-diagnosis signal. The wired AND circuit 146 calculates the logical AND of the oscillating signal and the first self-diagnosis signal and outputs a first operational-state original signal. The BPF 147 receives the first operational-state signal ST1 and has, as a passband, the first frequency range. The detection circuit 148 detects an output signal of the BPF 147 to output a detection signal a.

The safety supervisor unit 100 further includes second output photo coupler 153, a second oscillator 154, a second self-diagnosis unit 155, a wired AND circuit 156, a BPF 157, and a detection circuit 158. The second output photo coupler 153 includes a photo transistor 151 and a light emitting diode 152, the photo transistor 151 having the collector terminal thereof connected to a second low-potential side output terminal, and outputs the second operational-state signal ST2 via the second operational-state signal output terminal LSo12. The second oscillator 154 outputs an oscillating signal having the second frequency (500 Hz in the second embodiment). The second self-diagnosis unit 155 outputs a second self-diagnosis signal. The wired AND circuit 156 calculates the logical AND of the oscillating signal and the second self-diagnosis signal and outputs a second operational-state original signal. The BPF 157 receives the second operational-state signal ST2 and has, as a passband, the second frequency range. The detection circuit 158 detects an output signal of the BPF 157 to output a detection signal b.

The configurations of the first self-diagnosis unit 145 and the second self-diagnosis unit 155 are described here.

The first self-diagnosis unit 145 and the second self-diagnosis unit 155 have identical configurations and are exemplified by the first self-diagnosis unit 145 in the following description.

The first self-diagnosis unit 145 includes: a NAND circuit 160 to receive the detection signals A, B, C, and D and calculate and output the negative AND of those four detection signals; an AND circuit 161 to calculate and output the logical AND of an output signal of the NAND circuit 160, the detection signal a, and the detection signal b; a NOT circuit 162 to calculate the logical negation of the output from a power supply detecting circuit 170; and an OR circuit 163 calculates the logical OR of the output from the AND circuit 161 and the output from the NOT circuit 162 to output a reset signal.

That is, the OR circuit 163 outputs the reset signal when at least one of the detection signals A, B, C, and D from the upstream side in a daisy chain connection has not been detected (input) and the safety supervisor unit 100 is outputting the first operational-state signal ST1 and the second operational-state signal ST2 (having the detection signal a and the detection signal b input thereto); or when the power supply detecting circuit 170 detects a power supply abnormal state (for example, power supply voltage decrease).

The first self-diagnosis unit 145 further includes: a comparator 164 to compare the voltage signal P with a certain voltage and output a comparison result signal; an EX-NOR circuit 165 to calculate and output the exclusive NOR of the logical AND signal Q and the comparison result signal; an LPF 166 to remove a high-frequency component of the EX-NOR circuit 165 and output a direct-current component thereof; a comparator 167 to compare the output from the LPF 166 with a certain voltage to output a comparison result signal; and a NOR circuit 168 to receive inputs of the detection signals A, B, C, and D, the logical AND signal α, the logical AND signal β, and the detection signals a and b to calculate and output the logical NOR of those signals.

The first self-diagnosis unit 145 further includes: an AND circuit 169 to calculate and output the logical AND of the comparison result signal output by the comparator 167 and an output signal of the NCR circuit 168; a power supply detecting circuit 170 to detect a power supply and output a power supply detection signal; and a D flip-flop circuit 171 whose data terminal D receives an output signal of the AND circuit 169, whose clock terminal CLK receives an output signal of the power supply detecting circuit 170, and whose reset terminal RESET receives the reset signal output by the OR it 163, and which is configured to output a diagnosis result signal RS (RS1) to the wired AND circuit 146 at "H" level when that safety supervisor unit 100 is determined to be operating normally.

Next, operation according to the second embodiment is described.

When the first operational-state signal ST1 having the first frequency is input to the first photo coupler 103 of the safety supervisor unit 100 from an upstream device connected in a daisy chain to the anode of the light emitting diode 101, the first photo coupler 103 outputs the first operational-state signal ST1 in an insulated state to the BPF 115.

Consequently, the BPF 115 allows the first operational-state signal ST1 to pass therethrough and he output to the detection circuit 116. The detection circuit 116 then detects an output signal of the BPF 115 and determines whether the signal exceeds a certain threshold, and outputs the binarized detection signal A to the wired AND circuit 125, the NAND circuit 160 and the NOR circuit 168 in the first self-diagnosis unit 145.

Likewise, when the second operational-state signal ST2 having the second frequency is input to the second photo coupler 106 from an upstream device connected in a daisy chain to the anode of the light emitting diode 104, the second photo coupler 106 outputs the second operational-state signal ST2 in an insulated state to the BPF 117.

Consequently, the BPF 117 allows the second operational-state signal ST2 to pass therethrough and be output to the detection circuit 118. The detection circuit 118 then detects an output signal of the BPF 117 and outputs he detection signal B to the wired AND circuit 125, the NAND circuit 160 and the NOR circuit 168 in the first self-diagnosis unit 145.

As a result of these steps, the wired AND circuit 125 calculates the logical AND of the detection signals A and B and outputs that logical AND as the logical AND signal α to one input terminal of the wired NAND circuit 127.

When the second operational-state signal ST2 having the second frequency is input to the third photo coupler 100 from an upstream device connected in a daisy chain to the anode of the light emitting diode 107, the third photo coupler 109 outputs the second operational-state signal ST2 in an insulated state to the BPF 119.

Consequently, the BPF 119 allows the second operational-state signal ST2 to pass therethrough and he output to the detection circuit 120. The detection circuit 120 then detects an output signal of the BPF 119 and outputs the detection signal C to the wired AND circuit 125, the NAND circuit 160 and the NOR circuit 168 in the first self-diagnosis unit 145.

When the first operational-state signal ST1 having the first frequency is input to the fourth photo coupler 112 from an upstream device connected in a daisy chain to the anode of the light emitting diode 110, the fourth photo coupler 112 outputs the first operational-state signal ST1 in an insulated state to the BPS 121.

Consequently, the BPF 121 allows the first operational-state signal ST1 to pass therethrough and be output to the detection circuit 122. The detection circuit 122 then detects an output signal of the BPF 121 and outputs the detection signal D to the wired AND circuit 125, the NAND circuit 160 and the NOR circuit 168 in the first self-diagnosis unit 145.

As a result of these steps, the wired AND circuit 126 calculates the logical AND of the detection signals C and D and outputs that logical AND as the logical AND signal β to the other input terminal of the wired NAND circuit 127.

Therefore, the wired NAND circuit 127 outputs a negative-AND signal at the "H" level into one input terminal of the wired AND circuit 129 when any one or none of the logical AND signal α at the "H" level and the logical AND signal β at the "H" level is input to the wired NAND circuit 127. That is, when both of the logical AND signal α at the "H" level and the logical AND signal β at the "H" level are input thereto (at the time of normal operation), the negative-AND signal at the "L" level is output into one input terminal of the wired AND circuit 129.

In parallel to this step, the oscillator 128 outputs an oscillating signal having a certain frequency to the other input terminal of the wired AND circuit 129.

Therefore, the wired D circuit 129 outputs the logical AND signal Q that transitions between the "H" level and the "L" level in cycles of an output signal of the oscillator 128 if either or none of the logical AND signal α at the "H" level and the logical AND signal β at the "H" level is being input to the wired AND circuit 129, that is, during abnormal operation.

Thus, during abnormal operation, the buffer 130 also outputs a signal with a certain delay time with respect to the logical D signal Q, the signal matching the logical AND signal Q that transitions between the "H" level and the "L" level in cycles of the output signal of the oscillator 128

The high-potential side relay 13? enters the closed state (ON state) when the logical AND signal α is at the "H" level, and the low-potential side relay 134 enters the closed state (ON state) when the logical AND signal α is at the "H" level.

Consequently, the logical AND signal α and the logical AND signal β are at the "L" level, the high-potential side relay 132 and the low-potential side relay 134 are supposed to enter the open state (OFF state).

At this time, if the high-potential side relay 132 and the low-potential side relay 134 are operating normally, that is, if the high-potential side relay 132 and the low-potential side relay 134 are in the open state (OFF state), the logical AND signal Q transitions between the "H" level and the "P" level in cycles equal to the oscillation cycles of the oscillator 128. The voltage signal P also transitions between the "H" level and the "L" level in cycles equal to the oscillation cycles of the oscillator 128 with a certain delay time from the logical AND signal Q.

Figure 8:
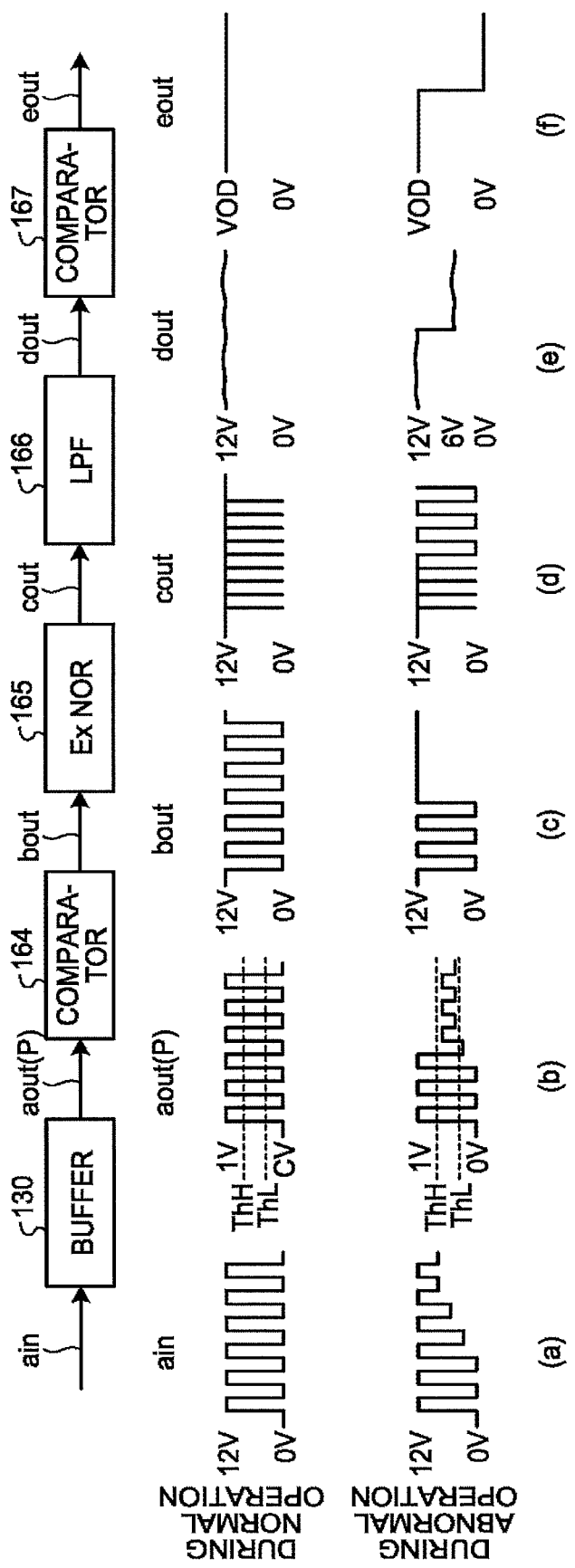
FIG. 8 is an explanatory chart of part of operation of a first self-diagnosis unit and a second self-diagnosis unit.

FIG. 8 is an explanatory chart of part of operation of the first self-diagnosis unit and the second self-diagnosis unit.

In FIG. 8, the upper part of the waveform chart illustrates waveforms at the normal operation, and the lower part thereof illustrates waveforms at the occurrence of an abnormality in which the high-potential side relay 132 is in a welding state.

A signal ain to be input to the buffer 130 forms pulse signal that transitions between the "H" level and the "L" level in cycles equal to the oscillation cycles of the oscillator 128 as illustrated in the upper part of FIG. 8 (*a*).

As a result of this step, a signal aout (=the voltage signal P) also forms a pulse signal that transitions between the "H" level and the "L" level in cycles equal to the oscillation cycles of the oscillator 128 as illustrated in the upper part of FIG. 8 (*b*).

The comparator 164 in the first self-diagnosis unit 145 or the second self-diagnosis unit 155 compares the voltage signal P subjected to alternating-current coupling with a certain voltage and outputs a comparison result signal to the EX-NOR circuit 165.

As a result of this step, an output signal bout that the comparator 164 outputs into the EX-NOR circuit 165 forms a pulse signal that transitions between the "H" level and the "L" level in cycles equal to the oscillation cycles of the oscillator 128 as illustrated in the upper part of FIG. 8 (c).

A signal cout that the EX-NOR circuit 165 outputs forms a pulse signal that transitions in cycles equal to the oscillation cycles of the oscillator 128 as illustrated in the upper part of FIG. 8 (d).

Therefore, an output signal dout output by the LPF 166, which is a direct-current component obtained by removing a high-frequency component of the EX-NOR circuit 165, forms a signal substantially fixed at the "H" level, and an output signal eout from the comparator 167 is consequently also fixed at the "H" level. Thus, a normal state can be detected.

In contrast to those states, if the high-potential side relay 132 is in the welding state, current flows into a high-potential side power supply at the timing when the logical AND signal α and the logical AND signal β are at the "L" level. The signal ain input to the buffer 130 then has a gradually decreasing pulse amplitude as illustrated in the lower part of FIG. 8 (b), and the potential level thereof becomes relatively close to the high-potential side power-supply voltage.

As a result of this step, the output signal aout (=the voltage signal P) forms a pulse signal having a pulse amplitude that transitions between a threshold ThH and a threshold ThL, which corresponds to the hysteresis of the comparator 164 as illustrated in the lower part of FIG. 8 (b).

The comparator 164 in the first self-diagnosis unit 145 or the second self-diagnosis unit 155 compares the output signal aout (=voltage signal P) with a certain voltage and outputs a comparison result signal to the FX-NOR circuit 165.

As a result of this step, the output signal bout to be output by the comparator 164 into the EX-NOR circuit 165 is fixed at the "H" level after the high-potential side relay 132 enters the welding state as illustrated in the lower part of FIG. 8 (c).

Thus, the ED-NOR circuit 165 calculates the exclusive OR of the logical AND signal Q and the comparison result signal output by the comparator 164 and outputs this exclusive OR, as a signal Cout, to the LPF 166. That is, the EX-NOR circuit 165 outputs the output signal Cout at the "H" level to the LPF 166 when the logical AND signal Q and the comparison result signal from the comparator 164 have the same value.

In this case, the output signal cout from the EX-NOR circuit 165 forms a pulse signal having a certain pulse width as illustrated in the lower part of FIG. 8 when the logical AND signal α and the logical AND signal β are at the "L" level. Therefore, the output signal dout from the LPF 166 then forms a signal fixed at an intermediate potential, and the output signal eout from the comparator 167 is consequently fixed at the "L" level. Thus, an abnormal state can be detected.

If the low-potential side relay 134 in the welding state, current flows into a low-potential side power supply when the logical AND signal α and the logical AND signal β are at the "L" level. The voltage signal P then has a decreased pulse amplitude, and the potential level thereof becomes relatively close to the low-potential side power-supply voltage, resulting in the same operation as the operation to be performed when the high-potential side relay 132 is in the welding state.

Therefore, based on this voltage signal P, the self-diagnosis unit can detect whether the high-potential side relay 132 and the low-potential side relay 134 have a failure due to the welding.

The NOR circuit 168 outputs signal at the "H" level to the AND circuit 169 when detecting none of the detection signals A to D, the logical AND signals α and β, and the detection signals a and b.

Therefore, the AND circuit 169 outputs a signal at the "H" level to the data terminal D of the D flip-flop circuit 171 when detecting any of the detection signals A to D, the logical AND signals α and β, and the detection signals a and b while the high-potential side relay 132 and the low-potential side relay 134 is in a not welding state.

Therefore, while detecting none of the first operational-state signal ST1 and the second operational-state signal ST2 at the time of start-up (at the time of power-on, when the output from the power supply detecting circuit 170 transitions to the "H" level), the ID flip-flop circuit 171 outputs a signal at "H" level to the wired AND circuit 146 when both the high-potential side relay 132 and the low-potential side relay 134 have been in the not welding state.

As a result, at the time of start-up, the first operational-state signal ST1 having; the first frequency (5 kHz in the second embodiment) is output via a first output terminal to devices (the first overtemperature/overvoltage detecting circuit 26 and the second overtemperature/overvoltage detecting circuit 27 in the battery module 11-1 in the present embodiment) downstream in the daisy-chain connection.

Likewise, at the time of start-up, the second operational-state signal ST2 having the second frequency (500 Hz in the second embodiment) is output via a second output terminal to devices (the first overtemperature/overvoltage detecting circuit 26 and the second overtemperature/overvoltage detecting circuit 27 in the battery module 11-1 in the present embodiment) downstream in the daisy-chain connection.

As described above, according to the safety supervisor unit in the second embodiment, in a state where a certain device receives the first operational-state signal ST1 and the second operational-state signal ST2 indicating that upstream devices in the daisy-chain connection are operating normally, the certain device is outputting the first operational-state signal ST1 and the second operational-state signal ST2 indicating that the certain device itself is operating normally to downstream devices in the daisy-chain connection; and, if the high-potential side relay 132 and the low-potential ide relay 134 are then detected as being in the not welding state, the safety supervisor unit is determined to be operating normally, so that the first operational-state signal ST1 and the second operational-state signal ST2 are output to downstream devices in the daisy-chain connection at the time of start-up (at the time of power-on). Thus, the storage battery system 10 is allowed to enter the operational state if it is determined that the safety supervisor unit can reliably operate normally.

Third Embodiment

A third embodiment is described next.

Figure 9:
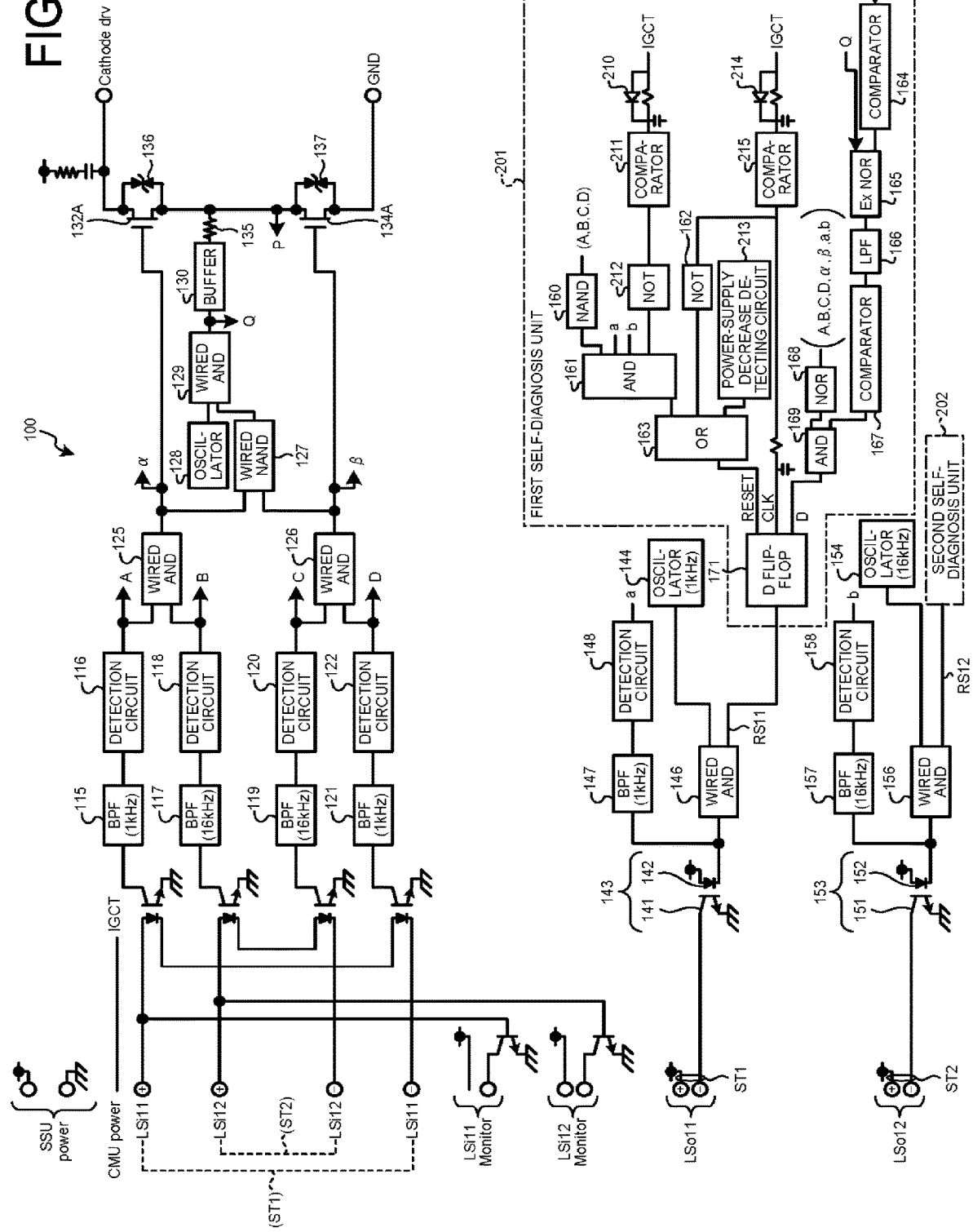
FIG. 9 is a schematic configuration block diagram of a safety supervisor unit according to a third embodiment.

FIG. 9 is a schematic configuration block diagram of a safety supervisor unit in the third embodiment.

In FIG. 9, the same components as those in the second embodiment illustrated in FIG. 7 are assigned the same reference signs.

The third embodiment differs from the second embodiment by: including an FET 132A in place of the NPN transistor 131 and the high-potential side relay 132; including an FET 134A in place of the NPN transistor 133 and the low-potential side relay 134; including a first self-diagnosis unit 201 and a second self-diagnosis unit 202 in place of the first self-diagnosis unit 145 and the second self-diagnosis unit 155; being configured to suppress transient voltage; and having a configuration capable of monitoring the voltage status of the power supply (CMU power) by allowing input to the safety supervisor unit 100 from a power supply (CMU power), from which the BMU 12 feeds power to the battery modules 11. In addition, the first frequency and the second frequency are set to 16 kHz and 1 kHz, respectively.

The configurations of the first self-diagnosis unit 201 and the second self-diagnosis unit 202 are described here.

The first self-diagnosis unit 201 and the second self-diagnosis unit 202 have identical configurations and are exemplified by the first self-diagnosis unit 201 in the following description.

The first self-diagnosis unit 201 includes: a NAND circuit 160 to receive inputs of the detection signals A, B, C, and D and calculate and output the negative AND of those four detection signals; a delay circuit 210 to transfer transition of the power supply IGCT for the battery modules 11-1 to 11-N while delaying the transition by a certain delay time (for example, three seconds); a comparator 211 to compare the voltage of the power supply IGCT with a certain reference voltage to detect whether power is being fed from the power supply IGCT; a NOT circuit 212 to calculate and output the logical negation of the output from the comparator 211; an AND circuit 161 calculates and outputs the logical AND of an output signal of the NAND circuit 160, the detection signals a and b, and an output signal of the NOT circuit 212; a power supply decrease detecting circuit 213 to detect a decrease in power supply; a delay circuit 214 to transfer transition of the power supply IGCT while delaying the transition by a certain delay time (for example, three seconds); a comparator 215 to compare the voltage of the power supply IGCT with a certain reference voltage to detect whether the power is feeding from the power supply IGCT; a NOT circuit 162 to calculate and output the logical negation of the output from the comparator 215; and an OR circuit 163 to calculate the logical OR of an output signal of the AND circuit 161, an output signal of the NOT circuit 162, and an output signal of the power-supply decrease detecting circuit 213 and output a reset signal.

That is, the OR circuit 163 outputs the reset signal if any of the following three conditions holds: at least one of the detection signals A, B, C, and D from the upstream side in a daisy-chain connection has not been detected (input), the safety supervisor unit 100 is outputting the first operational-state signal ST1 and the second operational-state signal ST2 (i.e., in a state where the detection signals a and b are input thereto), and the power supply IGCT is not outputting power (a first condition); the power supply IGCT is not outputting power (a second condition); and the power supply decrease detecting circuit 213 has detected a power supply voltage decrease (a third condition).

The first self-diagnosis unit 201 further includes: a comparator 164 to compare the voltage signal P with a certain voltage and output a comparison result signal; an EX-NOR circuit 165 to calculate and output the exclusive NOR of the logical AND signal Q and the comparison result signal; an LPF 166 to remove a high-frequency component of the EX-NOR circuit 165 and output a direct-current component thereof; a comparator 167 to compare the output from the LPF 166 with a certain voltage to output a comparison result signal; and a NOR circuit 168 to receive inputs of the detection signals A, B, C, and D, the logical AND signal α, the logical AND signal β, and the detection signals a and b to calculate and output the logical NOR of those signals.

The first self-diagnosis unit 201 further includes: an AND circuit 169 to calculate and output the logical AND of the comparison result signal output by the comparator 167 and an output signal of the NOR circuit 163; a power supply detecting circuit 170 to detect a power supply and output a power supply detection signal; and a D flip-flop circuit 171 whose data terminal D receives an output signal of the AND circuit 169, whose clock terminal CLK receives an output signal of the power supply detecting circuit 170, and whose reset terminal RESET receives the reset signal output by the OR circuit 163, and which is configured to output a diagnosis result signal RS (RS11) to the wired AND circuit 146 at "H" level when that safety supervisor unit 100 is determined to be operating normally.

The framework of operation of the safety supervisor unit 100 in the third embodiment is described here.

Figure 10:
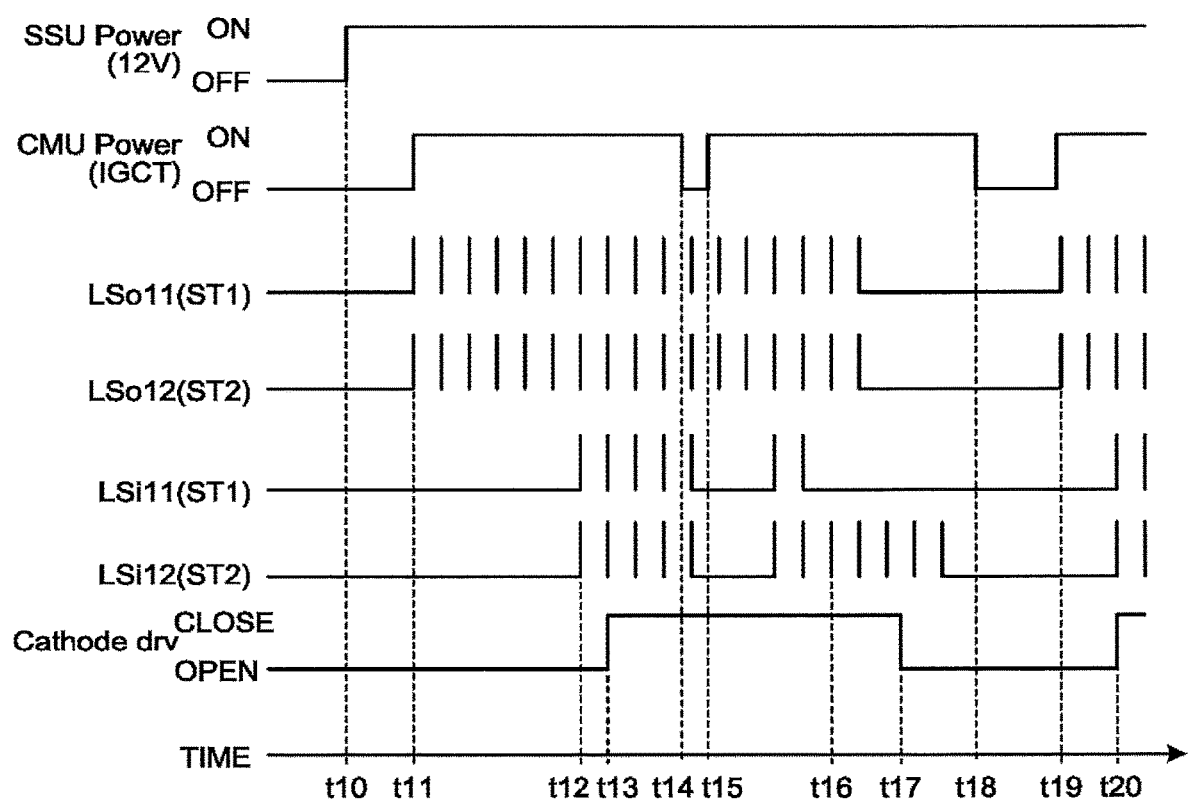
FIG. 10 is an operation timing chart of the safety supervisor unit according to the third embodiment.

FIG. 10 is an operation timing chart of the safety supervisor unit in the third embodiment.

At a clock time t10, the safety supervisor unit 100 is powered by the driving power supply (SSU power), so that failure diagnosis (detection of the welding state) is performed on a high-potential side relay 132 and a low-potential side relay 134, which are described later, until the battery modules 11-1 to 11-N are detected as being powered by the power supply IGCT.

Thereafter, in response to feeding from the power supply IGCT at a clock time t11, the first operational-state signal ST1 and the second operational-state signal ST2 starts being input to the battery module 11-1.

The first operational-state signal ST1 and the second operational-state signal ST2 that have been input to this first battery module 11-1 are transferred through the daisy chains to the battery module 11-2, then to the battery module 11-3, . . . , and then to the battery module 11-N to be transferred back to the safety supervisor unit 100 at a clock time t2.

Thus, at a clock time t3, the safety supervisor unit 100 having the first operational-state signal ST1 and the second operational-state signal ST2 transferred back thereto drives the high-potential side relay 132 and the low-potential side relay 134 to set the first contactor 16 and the second contactor 17 in the closed state (close), thereby transitioning to a power feeding state.

Meanwhile, it is possible that the BMU 12 restarts the power supply IGCT. If this restart is completed in less than one second for example, the safety supervisor unit 100 continues the power feeding state by keeping the first contactor 16 and the second contactor 17 in the closed state (close) as indicated by the period from a clock time t4 to a clock time t5 (less than one second) even when the power supply IGCT enters the no-power feeding state.

In addition, for example, as indicated by the period from a clock time t16 to a clock time t17, when any of the first operational-state signal ST1 and the second operational-state signal ST2 has not been transferred for at least a certain time (for example, one second) for example, the safety supervisor unit 100 assumes this state as indicating an operational abnormality and sets the first contactor 16 and the second contactor 17 in the open state (open), thereby transitioning to a no-power feeding state.

In contrast to these, the safety supervisor unit 100 is reset after being unable to detect the power supply IGCT for a certain time (for example, three seconds) as indicated by the period from a clock time t18 to a clock time t19 or when power stops being fed by the driving power supply (SSU power). The safety supervisor unit 13 then starts inputting the first operational-state signal ST1 and the second operational-state signal ST2 to the first battery module 11-1, and then repeats the same operation when the first operational-state signal ST1 and the second operational-state signal ST2 are again transferred to the safety supervisor unit 13 at the clock time t10.

Next, operation according to the third embodiment is described.

When the first operational-state signal ST1 having the first frequency is input to the first photo coupler 103 of the safety supervisor unit 100 from an upstream device connected in a daisy-chain to the anode of the light emitting diode 101, the first photo coupler 103 outputs the first operational-state signal ST1 in an insulated state to the BPF 115.

Consequently, the BPF 115 allows the first operational-state signal ST1 to pass therethrough and be output to the detection circuit 116. The detection circuit 116 then detects an output signal of the BPF 115 and outputs he detection signal A to the wired AND circuit 125, the NAND circuit 160 and the NOR circuit 168 in the first self-diagnosis unit 145.

Likewise, when the second operational-state signal ST2 having the second frequency is input to the second photo coupler 106 from an upstream device connected in a daisy chain to the anode of the light emitting diode 104, the second photo coupler 106 outputs the second operational-state signal ST2 in an insulated state to the BPF 117.

Consequently, the BPF 117 allows the second operational-state signal ST2 to pass therethrough and be output to the detection circuit 116. The detection circuit 116 then detects an output signal of the BPS 115 and outputs the detection signal B to the wired AND circuit 125, the NAND circuit 160 and the NOR circuit 168 in the first self-diagnosis unit 145.

As a result of these steps, the wired AND circuit 125 calculates the logical AND of the detection signals A and B and outputs that logical AND as the logical AND signal α to one input terminal of the wired NAND circuit 127.

When the second operational-state signal ST2 having the second frequency is input to the third photo coupler 109 from an upstream device connected in a daisy chain to the anode of the light emitting diode 107, the third photo coupler 109 outputs the second operational-state signal ST2 in an insulated state to the BPS 119.

Consequently, the BPF 119 allows the second operational-state signal ST2 to pass therethrough and be output to the detection circuit 120. The detection circuit 120 then detects an output signal of the BPS 119 and outputs the detection signal C to the wired AND circuit 125, the NAND circuit 160 and the NOR circuit 166 in the first self-diagnosis unit 145.

When the first operational-state signal ST1 having the first frequency is input to the fourth photo coupler 112 from an upstream device connected in a daisy chain to the anode of the light emitting diode 110, the fourth photo coupler 112 outputs the first operational-state signal ST1 in an insulated state to the BPS 121.

Consequently, the BPS 121 allows the first operational-state signal ST1 to pass therethrough and be output to the detection circuit 122. The detection circuit 122 then detects an output signal of the BPF 121 and outputs the detection signal D to the wired AND circuit 125, the NAND circuit 160 and the NOR circuit 168 in the first self-diagnosis unit 145.

As a result of these steps, the wired AND circuit 126 calculates the logical AND of the detection signals and D and outputs that logical AND as the logical AND signal β to the other input terminal of the wired NAND circuit 127.

Therefore, the wired NAND circuit 127 outputs a negative-AND signal at the "H" level into one input terminal of the wired AND circuit 129 when any one or none of the logical AND signal α at the "H" level and the logical AND signal β at the "H" level is input to the wired NAND circuit 127. That is, when both of the logical AND signal α at the "H" level and the logical AND signal β at the "H" level are input thereto (at the time of normal operation), the negative-AND signal at the "L" level is output into one input terminal of the wired AND circuit 129.

In parallel to this step, the oscillator 128 outputs an oscillating signal having a certain frequency to the other input terminal of the wired AND circuit 129.

Therefore, the wired AND circuit 129 outputs the logical AND signal Q that transitions between the "H" level and the "L" level in cycles of an output signal of the oscillator 128 if either or none of the logical AND signal a at the "H" level and the logical AND signal β at the "H" level is being input to the wired AND circuit 129, that is, during abnormal operation.

Thus, during abnormal operation, the buffer 130 also outputs a signal with a certain delay time with respect to the logical D signal Q, the signal matching the logical AND signal Q that transitions between the "H" level and the "L" level in cycles of the output signal of the oscillator 128.

The high-potential side relay 132 enters the closed state (ON state) when the logical AND signal α is at the "H" level, and the low-potential side relay 134 enters the closed state (ON state) when the logical AND signal α is at the "H" level.

Consequently, the logical AND signal α and the logical AND signal β are at the "L" level, the high-potential side relay 132 and the low-potential side relay 134 are supposed to enter the open state (OFF state).

At this time, if the high-potential side relay 132 and the low-potential side relay 134 are operating normally, that is, if the high-potential side relay 132 and the low-potential side relay 134 are in the open state (OFF state), the logical AND signal Q transitions between the "H" level and the "L" level in cycles equal to the oscillation cycles of the oscillator 128. The voltage signal P also transitions between the "H" level and the "L" level in cycles equal to the oscillation cycles of the oscillator 128 with a certain delay time from the logical AND signal Q.

That is, the voltage signal P also forms a pulse signal that transitions between the "H" level and the "L" level in cycles equal to the oscillation cycles of the oscillator 128.

The subsequent operations according to the third embodiment are the same as those according to the second embodiment, and the detailed description thereof is incorporated herein by reference.

As a result, at the time of start-up, the first operational-state signal ST1 having the first frequency (16 kHz in the third embodiment) is output via a first output terminal to downstream devices in the daisy-chain connection (the first overtemperature/overvoltage detecting circuit 26 and the second overtemperature/overvoltage detecting circuit 27 in the battery module 11-1 in the present embodiment).

Likewise, at the time of start-up, the second operational-state signal ST2 having the second frequency (1 kHz in the third embodiment) is output via a second output terminal to downstream devices in the daisy-chain connection (the first overtemperature/overvoltage detecting circuit 26 and the second overtemperature/overvoltage detecting circuit 27 in the battery module 11-1 in the present embodiment).

As described above, the safety supervisor unit in the third embodiment also allows the storage battery system 10 to enter the operational state if it is determined that the safety supervisor unit can reliably operate normally. This is enabled by operation such that: in a state where a certain device receives the first operational-state signal ST1 and the second operational-state signal ST2 indicating that upstream devices in the dasy-chain connection are operating normally, the certain device is outputting the first operational-state signal ST1 and the second operational-state signal ST2 indicating that the certain device is also operating normally to downstream devices in the daisy-chain connection; and, if the high-potential side relay 132 and the low-potential side relay 134 are then detected as being in the not welding state, the safety supervisor unit is determined to be operating normally, so that the first operational-state signal ST1 and the second operational-state signal ST2 are output to downstream devices in the daisy-chain connection at the time of start-up (at the time of power-on).

The above description illustrates cases each including: overtemperature/overvoltage detecting units of two systems (equivalent to cases where n=2); and the safety supervisor unit 13 that is connected in two daisy-chain connection systems to and together with the N battery modules 11-1 to 11-N and shuts off contactors upon being notified via either of the daisy-chain connection systems that any of the battery modules is in an abnormal state. However, another possible configuration is a case including: overtemperature/overvoltage detecting units of n systems; and the safety supervisor unit 13 that is connected in daisy chains of n systems to and together with the N battery modules 11-1 to 11-N and shuts off contactors upon being notified through any of the daisy-chain connection systems that any of the battery modules is in an abnormal state.

Although the embodiments of the present invention have been explained, these embodiments are merely provided for an exemplifying purpose, and do not intend to limit the scope of the present invention. These novel embodiments can be carried out with other various configurations, and various abbreviations, substitutions, or modifications can be made without departing from the gist of the present invention. These embodiments and modifications thereof are embraced by the scope and the gist of the present invention, and are also embraced by the present invention described in claims and equivalents thereof.

The invention claimed is:

1. A battery module comprising:
   a battery cell unit including a plurality of battery cells connected together in series or series-parallel;
   a cell monitoring unit configured to monitor temperatures and voltages of the battery cells; and
   n overtemperature/overvoltage detecting units corresponding to n systems, n is an integer greater than or equal to 2, the n overtemperature/overvoltage detecting units of the n systems being configured to independently detect an overtemperature or an overvoltage of the battery cells as an abnormal state, and to mutually notify one another of results of the detection, and each of the n overtemperature/overvoltage detecting units being connected to the plurality of battery cells, the n overtemperature/overvoltage detecting units including first and second overtemperature/overvoltage detecting units, wherein
   the first overtemperature/overvoltage detectine unit is configured to, upon detecting an abnormal state of battery cells corresponding to the the first overtemperature/overvoltage detecting unit, notify the second overtemperature/overvoltage detecting unit of a detection result,
   when the second overtemperature/overvoltage detecting unit is unable to operate normally in the battery module, the second overtemperature/overvoltage detecting unit is configured to, upon receiving the detection result from the first overtemperature/overvoltage detecting unit, perform an operation that is performed when detecting an abnormal state of battery cells corresponding to the second overtemperature/overvoltage detecting unit, without detecting the abnormal state, and
   the first and second overtemperature/overvoltage detecting units output pulse signals having frequencies different between the n systems when the abnormal state is not being detected. and stop outputting the pulse signals upon detecting the abnormal state.

2. The battery module according to claim 1, wherein
   each of the overtemperature/overvoltage detecting units includes a communication interface to communicate with other overtemperature/overvoltage detecting units of the n systems in another battery module through daisy-chain connections of the n systems, and
   each of the overtemperature/overvoltage detecting units is configured to perform communication with the other overtemperature/overvoltage detecting units via the communication interface.

3. The battery module according to claim 1, wherein the overtemperature/overvoltage detecting units are implemented as wired logic circuits.

4. A storage battery system comprising:
   a plurality of battery modules each comprising a battery cell unit including a plurality of battery cells connected together in series or series-parallel, and a cell monitoring unit configured to monitor temperatures and voltages of the battery cells, the battery modules being connected to one another in such a manner that the battery cell units are connected in series between a high-potential side output terminal and a low-potential side output terminal via contactors;
   a battery management unit configured to manage the battery modules via the cell monitoring units; and
   a safety supervisor unit connected in daisy chains of n systems, n is an integer greater than or equal to 2, to and together with the battery modules and configured to shut off the contactors upon being notified through any one of the daisy chains of the n systems that any of the battery modules is in an abnormal state, wherein
   each of the battery modules includes n overtemperature/overvoltage detecting units corresponding to the n systems, the overtemperature/overvoltage detecting units being configured to independently detect an overtemperature or an overvoltage of the battery cells as an abnormal state, and to mutually notify one another of results of the detection, and each of the n overtemperature/overvoltage detecting units being connected to the plurality of battery cells, the battery modules including first and second battery modules, the n overtemperature/overvoltage detectingunits including first and second overtemperature/overvoltage detecting units,
   the first overtemperature/overvoltage detecting unit in the first battery module is configured to, upon detecting an abnormal state of battery cells corresponding to the first overtemperature/overvoltage detecting unit in the first battery module, notify the second overtemperature/overvoltage detecting unit in the first battery module or the second overtemperature/overvoltage detecting unit in the second module connected in the daisy chain of a detection result,
   when the second overtemperature/overvoltage detecting unit is unable to operate normally in the first battery module or the second overtemperature/overvoltage detecting unit in the second battery module does not detect an abnormal state, the second overtemperature/overvoltage detecting unit in the first or second battery module is configured to, upon receiving the detection result from the first overtemperature/overvoltage detecting unit in the first battery module, perform an operation that is performed when detecting an abnormal state of battery cells corresponding to the second overtemperature/overvoltage detective unit in the first or second battery module, without detecting the abnormal state, and the first and second overtemperature/overvoltage detecting units output pulse signals having frequencies different between the n systems when the abnormal state is not being detected, and stop outputting the pulse signals upon detecting the abnormal state.

5. The storage battery system according to claim 4, wherein the overtemperature/overvoltage detecting units are implemented as wired logic circuits.

* * * * *